(12) United States Patent
Hubner et al.

(10) Patent No.: US 11,937,531 B2
(45) Date of Patent: Mar. 26, 2024

(54) SYSTEMS AND METHODS FOR SELECTIVE MATERIAL PLACEMENT

(71) Applicant: Deere & Company, Moline, IL (US)

(72) Inventors: Cary S. Hubner, Geneseo, IL (US); Elijah B. Garner, Bettendorf, IA (US); Grant J. Wonderlich, Milan, IL (US)

(73) Assignee: Deere & Company, Moline, IL (US)

( * ) Notice: Subject to any disclaimer, the term of this patent is extended or adjusted under 35 U.S.C. 154(b) by 395 days.

(21) Appl. No.: 16/895,253

(22) Filed: Jun. 8, 2020

(65) Prior Publication Data

US 2021/0378165 A1 Dec. 9, 2021

(51) Int. Cl.

| | |
|---|---|
| *A01C 21/00* | (2006.01) |
| *A01C 5/06* | (2006.01) |
| *A01C 7/06* | (2006.01) |
| *A01C 7/08* | (2006.01) |
| *A01C 23/00* | (2006.01) |
| *A01M 7/00* | (2006.01) |
| *A01M 9/00* | (2006.01) |

(52) U.S. Cl.
CPC ............ *A01C 21/005* (2013.01); *A01C 5/062* (2013.01); *A01C 7/06* (2013.01); *A01C 23/007* (2013.01); *A01M 7/0089* (2013.01); *A01C 7/08* (2013.01); *A01M 9/0092* (2013.01)

(58) Field of Classification Search
CPC ......... A01C 21/005; A01C 5/062; A01C 7/08; A01C 23/007; A01C 21/00; A01C 5/06; A01C 5/00; A01C 7/00; A01C 23/00; A01C 7/06; A01M 7/0089; A01M 9/0092; A01M 7/00; A01M 9/00

See application file for complete search history.

(56) References Cited

U.S. PATENT DOCUMENTS

| | | |
|---|---|---|
| 4,653,410 A | 3/1987 | Typpi |
| 5,074,585 A | 12/1991 | Satoh |
| 6,150,158 A | 11/2000 | Bhide et al. |
| 6,553,312 B2 | 4/2003 | Upadhyaya et al. |
| 6,748,884 B1 | 6/2004 | Bitten et al. |
| 6,941,225 B2 | 9/2005 | Upadhyaya et al. |
| 7,270,065 B2 | 9/2007 | Conrad |
| 7,370,589 B2 | 5/2008 | Wilkerson et al. |
| 7,591,226 B2 | 9/2009 | Dix et al. |
| 8,074,585 B2 | 12/2011 | Wilkerson et al. |
| 8,074,586 B2 | 12/2011 | Garner et al. |
| 8,322,293 B2 | 12/2012 | Wollenhaupt et al. |

(Continued)

FOREIGN PATENT DOCUMENTS

| | | |
|---|---|---|
| AR | 112430 A1 | 10/2019 |
| EP | 2420122 A1 | 2/2012 |

(Continued)

OTHER PUBLICATIONS

U.S. Appl. No. 16/996,956 Application and Drawings, filed Aug. 19, 2020. _ pages.

(Continued)

*Primary Examiner* — Christopher J. Novosad
(74) *Attorney, Agent, or Firm* — Joseph R. Kelly; Kelly, Holt & Christenson PLLC

(57) ABSTRACT

Locations of seeds in a field can be identified using event-based processing or frequency-based processing. A material is applied to the field, based upon the seed locations.

19 Claims, 25 Drawing Sheets

(56) References Cited

U.S. PATENT DOCUMENTS

| | | | |
|---|---|---|---|
| 8,365,678 | B2 | 2/2013 | Morbidelli |
| 8,365,679 | B2 | 2/2013 | Landphair |
| 8,746,159 | B2 | 6/2014 | Garner et al. |
| 8,850,997 | B2 | 10/2014 | Silbernagel et al. |
| 9,043,951 | B2 | 6/2015 | Tolstedt et al. |
| 9,226,442 | B2 | 1/2016 | Grimm et al. |
| 9,955,625 | B2 | 5/2018 | Bauerer et al. |
| 10,602,656 | B2 | 3/2020 | Bartelson et al. |
| 11,259,457 | B2 | 3/2022 | Bartelson et al. |
| 11,602,095 | B2 | 3/2023 | Hubner et al. |
| 2004/0231575 | A1* | 11/2004 | Wilkerson ............... A01C 7/06 111/127 |
| 2006/0011647 | A1 | 1/2006 | Sauder et al. |
| 2010/0282141 | A1 | 11/2010 | Wollenhaupt et al. |
| 2011/0054743 | A1 | 3/2011 | Kocer et al. |
| 2013/0049198 | A1 | 2/2013 | Liao et al. |
| 2014/0048002 | A1 | 2/2014 | Grimm et al. |
| 2014/0182494 | A1 | 7/2014 | Friestad et al. |
| 2014/0230705 | A1 | 8/2014 | Radtke et al. |
| 2014/0261118 | A1 | 9/2014 | Mayerle |
| 2014/0352586 | A1 | 12/2014 | Straeter |
| 2015/0094916 | A1 | 4/2015 | Bauerer et al. |
| 2015/0319916 | A1 | 11/2015 | Garner et al. |
| 2016/0057923 | A1 | 3/2016 | Sauder et al. |
| 2016/0227700 | A1 | 8/2016 | Wendte et al. |
| 2016/0374260 | A1 | 12/2016 | Kowalchuk |
| 2017/0000022 | A1 | 1/2017 | Conrad |
| 2017/0049044 | A1 | 2/2017 | Stoller et al. |
| 2017/0055432 | A1 | 3/2017 | Graham et al. |
| 2017/0055433 | A1 | 3/2017 | Jamison |
| 2017/0251590 | A1 | 9/2017 | Kolb et al. |
| 2017/0251656 | A1 | 9/2017 | Kolb et al. |
| 2017/0265374 | A1 | 9/2017 | Wintemute et al. |
| 2018/0092294 | A1 | 4/2018 | Hubner |
| 2018/0192577 | A1 | 7/2018 | Smith et al. |
| 2019/0037765 | A1 | 2/2019 | Bartelson et al. |
| 2019/0166754 | A1 | 6/2019 | Johnson et al. |
| 2020/0000018 | A1 | 1/2020 | Boetsch |
| 2020/0037519 | A1 | 2/2020 | Wonderlich et al. |
| 2020/0288629 | A1 | 9/2020 | Bartelson et al. |
| 2021/0059107 | A1* | 3/2021 | Garner ................... A01C 7/105 |
| 2021/0127558 | A1 | 5/2021 | Hubner et al. |
| 2021/0127559 | A1 | 5/2021 | Hubner et al. |
| 2021/0127562 | A1 | 5/2021 | Wonderlich et al. |
| 2021/0378165 | A1 | 12/2021 | Hubner et al. |

FOREIGN PATENT DOCUMENTS

| | | | |
|---|---|---|---|
| EP | 2747541 | A2 | 7/2014 |
| EP | 2901836 | A1 | 8/2015 |
| EP | 3384748 | A1 | 10/2018 |
| EP | 3437450 | A1 | 2/2019 |
| EP | 3785508 | A1 | 3/2021 |
| WO | 2007136606 | A2 | 11/2007 |
| WO | 2008155235 | A1 | 12/2008 |
| WO | WO2014018717 | A1 | 1/2014 |
| WO | 15048867 | A1 | 4/2015 |
| WO | 17112892 | A1 | 6/2017 |
| WO | WO2019050944 | A1 | 3/2019 |

OTHER PUBLICATIONS

EP Patent Application No. 18181768.5-1011 Extended European Search Report dated Dec. 13, 2018, 12 pages.

Application and Drawings for U.S. Appl. No. 16/670,383, filed Oct. 31, 2019, 73 pages.

Application and Drawings for U.S. Appl. No. 16/670,312, filed Oct. 31, 2019, 73 pages.

Prosecution History for U.S. Appl. No. 15/669,424 including: Notice of Allowance dated Nov. 22, 2019, Amendment dated Oct. 23, 2019, Non-Final Office Action dated Jul. 23, 2019, Amendment dated Jun. 26, 2019, Non-Final Office Action dated Feb. 26, 2019, and Application and Drawings filed Aug. 4, 2017, 85 pages.

Application and Drawings for U.S. Appl. No. 16/830,878, filed Mar. 26, 2020, 28 pages.

Non-Final Office Action for U.S. Appl. No. 16/670,312 dated Dec. 10, 2021, 9 pages.

Non-Final Office Action for U.S. Appl. No. 16/670,383 dated Dec. 13, 2021, 6 pages.

Extended European Search Report and Written Opinion issued in European Patent Application No. 21176932.8, dated Oct. 18, 2021, in 13 pages.

Notice of Allowance for U.S. Appl. No. 16/670,312, dated Apr. 14, 2022, 5 pages.

Non-Final Office Action for U.S. Appl. No. 16/830,878, dated Jul. 12, 2021, 7 pages.

Notice of Allowance for U.S. Appl. No. 16/830,878 dated Oct. 28, 2021, 7 pages.

Extended European Search Report and Written Opinion issued in European Patent Application No. 20202216.6, dated Mar. 29, 2021, 11 pages.

Extended European Search Report and Written Opinion issued in European Patent Application No. 20204751.0, dated Mar. 29, 2021, 9 pages.

Extended European Search Report and Written Opinion issued in European Patent Application No. 20197797.2, dated Jan. 12, 2021, in 12 pages.

Application and Drawings filed for U.S. Appl. No. 17/859,368 dated Jul. 7, 2022, 73 pages.

Application and Drawings from U.S. Appl. No. 17/579,776 dated Jan. 20. 2022, 28 pages.

Notice of Allowance from U.S. Appl. No. 16/670,383 dated Apr. 26. 2022, 5 pages.

Non Final Office Action from U.S. Appl. No. 16/996,956 dated Sep. 13, 2023, 12 pages.

* cited by examiner

SYSTEMS AND METHODS FOR SELECTIVE MATERIAL PLACEMENT

FIELD OF THE DESCRIPTION

The present description relates to agricultural machines. More specifically, the present description relates to controlling application of material to a field, using an agricultural machine.

BACKGROUND

There is a wide variety of different types of agricultural machines that apply material to an agricultural field. Some such agricultural machines include sprayers, tillage machines with side dressing bars, air seeders, and planters that have row units, among other things.

As one example, a row unit is often mounted to a planter with a plurality other row units. The planter is often towed by a tractor over soil where seed is planted in the soil, using the row units. The row units on the planter follow the ground profile by using a combination of a down force assembly that imparts a down force to the row unit to push disk openers into the ground and gauge wheels to set depth of penetration of the disk openers.

Row units can also be used to apply material to the field (e.g., fertilizer, herbicide, insecticide or pesticide to the soil, to a seed, etc.) over which they are traveling. In some scenarios, each row unit has a valve that is coupled between a source of material to be applied, and an application assembly. As the valve is actuated, the material passes through the valve, from the source to the application assembly, and is applied to the field. In other scenarios, each row unit has a commodity tank and a commodity delivery system that delivers a commodity (such as fertilizer, herbicide, insecticide, pesticide, etc.) to the soil.

Many current systems apply the material in a substantially continuous way. For instance, where the application machine is applying a liquid fertilizer, it actuates the valve to apply a substantially continuous strip of the liquid fertilizer. The same is true of machines that apply other liquid substances, as examples. Machines that apply granular material often have an agitator that moves the material to an opening in the bottom of the commodity tank, where it is applied to the field.

The discussion above is merely provided for general background information and is not intended to be used as an aid in determining the scope of the claimed subject matter.

SUMMARY

Locations of seeds in a field can be identified using event-based processing or frequency-based processing. A material can be applied to the field, based upon the seed locations.

Example 1 is a planting machine, comprising:

a furrow opener that opens a furrow as the planting machine moves across a field;

a seed delivery system that delivers seeds to seed locations in the furrow;

a device that is actuated to apply a material to the field;

a device actuation timing system that generates a device actuation timing indicator indicative of a timing for actuating the device to apply the material at material placement locations relative to the seed locations; and a device control signal generator that receives the device actuation timing indicator and generates a device actuation signal based on the device actuation timing indicator to control the device to apply the material to the field.

Example 2 is the planting machine of any or all previous examples wherein the device actuation timing system comprises:

a frequency driven processing system configured to generate an a priori seed pattern indicative of a relative placement of seeds in the field, relative to a reference point.

Example 3 is the planting machine of any or all previous examples wherein the reference point comprises a location of a known planting operation, and wherein the frequency driven processing system comprises:

a planting operation start detector configured to detect when the planting machine is at the location of the known planting operation and to generate a planting operation reference signal indicative of the reference point.

Example 4 is the planting machine of any or all previous examples wherein the frequency driven processing system comprises:

time to actuation calculator logic configured to generate the device actuation timing indicator based on the a priori seed pattern and the planting operation reference signal.

Example 5 is the planting machine of any or all previous examples wherein the frequency driven processing system comprises:

a seed pattern verification system configured to intermittently verify that the a priori seed pattern is accurate based on a detected actual seed pattern.

Example 6 is the planting machine of any or all previous examples wherein the seed pattern verification system comprises:

an actual seed pattern detection system configured to detect an actual seed pattern;

a pattern correction value identifier configured to identify a pattern correction value based on the a priori seed pattern and the actual seed pattern; and seed pattern correction logic configured to apply the pattern correction value to the a priori seed pattern to generate a corrected seed pattern.

Example 7 is the planting machine of any or all previous examples and further comprising:

a seed sensor configured to detect a seed and generate a seed sensor signal indicative of the detected seed.

Example 8 is the planting machine of any or all previous examples wherein the device actuation timing system comprises:

an event driven processing system configured to generate the device actuation timing indicator based on the seed sensor signal.

Example 9 is the planting machine of any or all previous examples wherein the seed sensor is located at a seed sensor location on the planting machine and wherein the event driven processing system comprises:

a time stamp generator configured to generate a time stamp corresponding to the seed sensor signal indicating a detected seed.

Example 10 is the planting machine of any or all previous examples wherein the event driven processing system comprises:

a system delay generator that generates a seed travel time delay value indicative of a time delay between the time stamp and a time when the detected seed will be in a final seed position.

Example 11 is the planting machine of any or all previous examples wherein the event driven processing system is configured to generate the device actuation timing indicator based on a device position of the device on the planting machine and based on the seed travel time delay value.

Example 12 is the planting machine of any or all previous examples wherein the event driven processing system comprises:

a device time offset generator configured to generate a device time offset value indicative of a time delay between generating the device actuation signal and a time when the material is applied to the field based on a responsiveness of the device.

Example 13 is the planting machine of any or all previous examples wherein the event driven processing system comprises:

a pulse timing generator configured to generate a pulse timing output indicative of a time when the device control signal generator is to generate the device control signal to actuate the device to apply the material.

Example 14 is the planting machine of any or all previous examples wherein the event driven processing system comprises:

a pulse duration generator configured to output a pulse duration signal indicative of a duration for which the device control signal generator is to generate the device control signal to actuate the device.

Example 15 is the planting machine of any or all previous examples wherein the event driven processing system comprises:

a travel distance generation system configured to identify a seed travel distance and generate an output indicative of when the seed is in the final seed location based on the seed travel distance.

Example 16 is the planting machine of any or all previous examples and further comprising:

a seed firmer, wherein the seed sensor is mounted to the seed firmer.

Example 17 is the planting machine of any or all previous examples wherein the valve is mounted to the seed firmer.

Example 18 is the planting machine of any or all previous examples wherein the valve is mounted to the seed delivery system Example 19 is the planting machine of any or all previous examples wherein the seed sensor is configured to sense the seed in the furrow.

Example 20 is a method of controlling a planting machine, comprising:

opening a furrow as the planting machine moves across a field;

delivering seeds to seed locations in the furrow;

generating a device actuation timing indicator indicative of a timing for actuating a device to apply material at material placement locations relative to the seed locations; and generating a device actuation signal based on the device actuation timing indicator to control the device to apply the material to the field. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, many current systems apply material to a field in a relatively continuous way. This can result in wasted material. For instance, some material that is applied at certain locations between seeds or plants in a field may be unnecessary. Similarly, it may be desirable to apply some material only at locations other than seeds. Thus, continuous application can result in lower productivity and lower efficiency. This problem can be exacerbated in instances where the material is applied at a relatively high rate, such as in the case of high rate fertilizer application.

The present description thus proceeds with respect to a system that identifies a specific location, e.g., a seed location, and controllably dispenses or applies material, based upon the seed location (and/or position) in a field. The system can do this by sensing seeds, as they are planted in the soil, and then calculating a time when an application valve or actuator (e.g., a pump, or granular dispenser) should be actuated to apply the material, based upon the location of the valve or actuator relative to the location of the seed. Similarly, an a priori seed map can be obtained indicating where seeds will be planted (e.g., seed locations) and the system controllably dispenses or applies material based on those a priori locations. The seeds can then be planted later. Further, the system can be used to apply the material and generate a material map of the locations where it was applied. A seed map can be generated based on the material map, and seeds can be planted based on that seed map. Other things can be considered as well, such as the responsiveness of the valve or actuator, the material properties of the material being applied, etc. The present description also proceeds with respect to controlling motors in the planter based on angular position of the motors. These, and other things are contemplated herein.

Also, the present description proceeds with respect to some of the examples being deployed on a row unit of a planter. They could just as easily be deployed on a sprayer, an air seeder, a tillage machine with a side-dress bar, or other piece of agricultural equipment that is used to apply a material.

Figure 1:
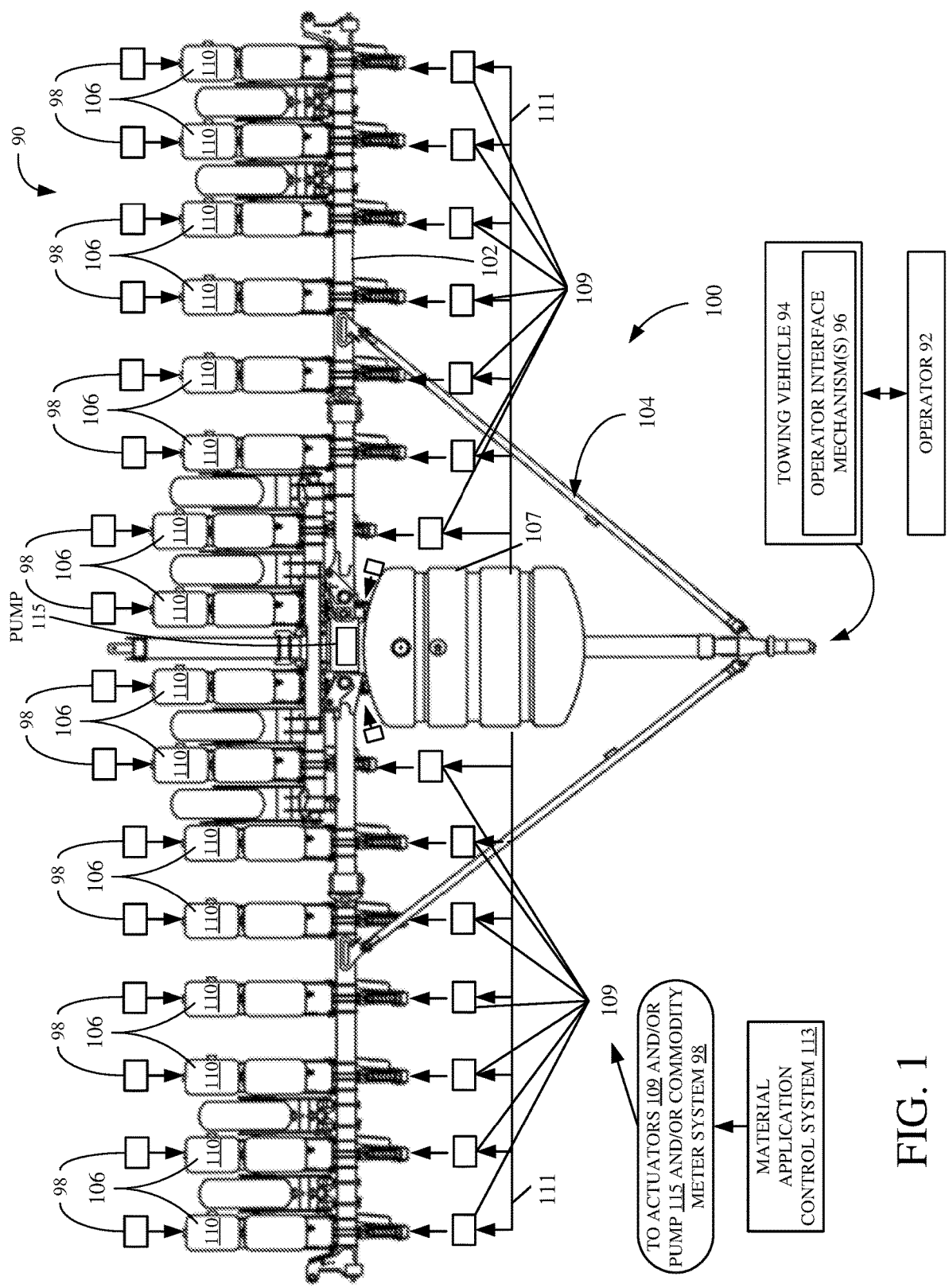
FIG. 1 is a top view of one example of a seeding or planting machine, shown in a partial pictorial and partial schematic form.

FIG. 1 is a partial pictorial, partial schematic top view of one example of an architecture 90 that includes agricultural planting machine 100, towing vehicle 94, that is operated by operator 92, and material application control system 113, which can be on one or more individual parts of machine 100 (such as on each row unit, or set of row units), centrally located on machine 100, distributed about the architecture 90, or on towing vehicle 94. Operator 92 can illustratively interact with operator interface mechanisms 96 to manipulate and control vehicle 94, system 113, and some or all portions of machine 100.

Machine 100 is a row crop planting machine that illustratively includes a toolbar 102 that is part of a frame 104. FIG. 1 also shows that a plurality of planting row units 106 are mounted to the toolbar 102. Machine 100 can be towed behind towing vehicle 94, such as a tractor. FIG. 1 shows that material can be stored in a tank 107 and pumped through a supply line 111 so the material can be dispensed in or near the rows being planted. In one example, a set of devices (e.g., actuators) 109 is provided to perform this operation. For instance, actuators 109 can be individual pumps that service individual row units 106 and that pump material from tank 107 through supply line 111 so it can be dispensed on the field. In such an example, material application control system 113 controls the pumps 109. In another example, actuators 109 are valves and one or more pumps 115 pump the material from tank 107 to valves 109 through supply line 111. In such an example, material application control system 113 controls valves 109 by generating valve or actuator control signals, e.g., on a per-seed basis, as described below. The control signal for each valve or actuator can, in one example, be a pulse width modulated control signal. The flow rate through the corresponding valve 109 can be based on the duty cycle of the control signal (which controls the amount of time the valve is open and closed). It can be based on multiple duty cycles of multiple valves or based on other criteria. Further, the material can be applied in varying rates on a per-seed or per-plant basis. For example, fertilizer may be applied at one rate when it is being applied at a location spaced from a seed location and at a second, higher, rate when it is being applied closer to the seed location. These are examples only.

In addition, each row unit 106 can have a commodity tank 110 that stores material to be applied. A commodity delivery system 98 (as is discussed in greater detail below) can have a motor that drives a commodity meter that dispenses an amount of the material. The motor can be controlled by material application control system 113 to dispense the material at desired locations. The commodity in tank 110 can be granular or in other form.

Figure 2:
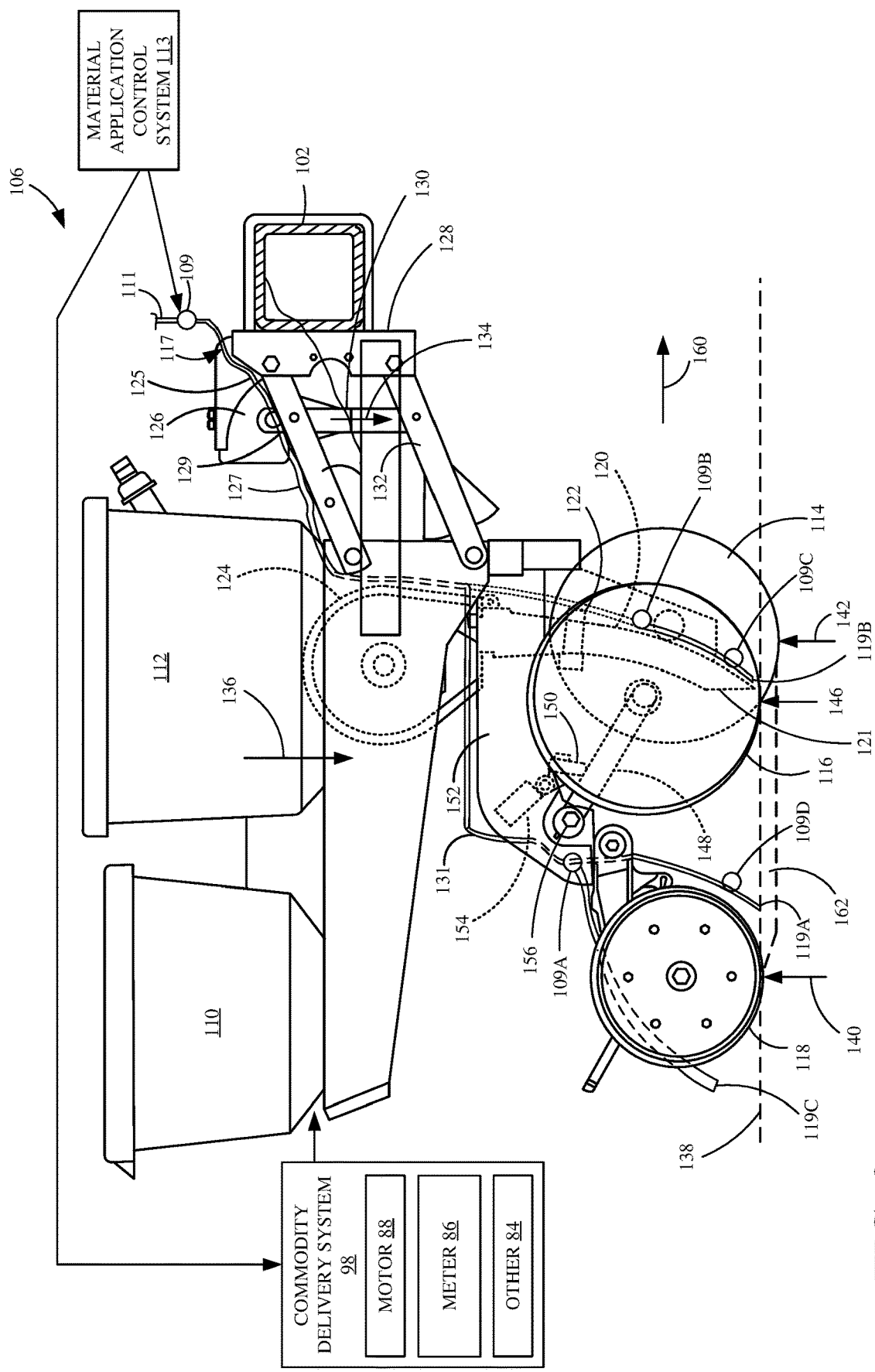
FIG. 2 is a side view showing one example of a row unit of the planting machine illustrated in FIG. 1.

FIG. 2 is a side view of one example of a row unit 106, with actuator 109 and system 113 shown as well. Actuator 109 is shown in five possible locations labeled as 109, 109A, 109B, 109C and 109D. Row unit 106 illustratively includes a chemical tank (also referred to herein as a commodity tank) 110, a seed storage tank 112 and commodity delivery system 98 (which, itself, includes a motor 88, a commodity meter 86 and it can include other items 84). It also illustratively includes one or more disc openers 114, a set of gauge wheels 116, and a set of closing wheels 118. Seeds from tank 112 are fed into a seed meter 124, e.g., by gravity or from a centralized commodity distribution system (e.g., exploiting pneumatic commodity distribution to each row unit). The seed meter 124 controls the rate at which seeds are dropped into a seed tube 120 or other seed delivery system, such as a brush belt or flighted belt (shown in FIGS. 9-10, respectively), from seed storage tank 112. The seeds can be sensed by a seed sensor 122.

In the example shown in FIG. 2, liquid material is passed, e.g., pumped or otherwise forced, through supply line 111 to an inlet end of actuator 109. Actuator 109 is controlled by control system 113 to allow the liquid to pass from the inlet end of actuator 109 to an outlet end.

As liquid passes through actuator 109, it travels through an application assembly 117 from a proximal end (which is attached to an outlet end of actuator 109) to a distal tip (or application tip) 119, where the liquid is discharged into a trench, or proximate a trench or furrow 162, opened by disc opener 114 (as is described in more detail below). FIG. 2 shows that the application assembly 117 can have distal tip 119 in different locations labelled 119A, 119B and 119C in the examples shown in FIG. 2.

Material application control system 113 can generate control signals to control motor 88 to drive commodity meter 86. Metering system 86, when driven by motor 88, meters out a desired amount of commodity from tank 110 and delivers it to a desired location relative to a seed location. This is described in greater detail below.

Some parts of row unit 106 will now be discussed in more detail. First, it will be noted that there are different types of seed meters 124, and the one that is shown is shown for the sake of example only and is described in greater detail below. However, in one example, each row unit 106 need not have its own seed meter. Instead, metering or other singulation or seed dividing techniques can be performed at a central location, for groups of row units 106. The metering systems can include finger pick-up discs and/or vacuum meters (e.g., having rotatable discs, rotatable concave or bowl-shaped devices), among others. The seed delivery system can be a gravity drop system (such as seed tube 120 shown in FIG. 2) in which seeds are dropped through the seed tube 120 and fall (via gravitational force) through the seed tube and out the outlet end 121 into the seed trench 162. Other types of seed delivery systems may be or may include assistive systems, in that they do not simply rely on gravity to move the seed from the metering system into the ground. Instead, such assistive systems actively assist the seeds in moving from the meter to a lower opening, where they exit or are deposited into the ground or trench. These can be systems that physically capture the seed and move it from the meter to the outlet end of the seed delivery system or they can be pneumatic systems that pump air through the seed tube to assist movement of the seed. The air velocity can be controlled to control the speed at which the seed moves through the delivery system. Some examples of assistive systems are described in greater detail below with respect to FIGS. 9 and 10.

A downforce actuator 126 is mounted on a coupling assembly 128 that couples row unit 106 to toolbar 102. Actuator 126 can be a hydraulic actuator, a pneumatic actuator, a spring-based mechanical actuator or a wide variety of other actuators. In the example shown in FIG. 2, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on row unit 106, and indicated by arrow 136) is offset by upwardly directed forces acting on closing wheels 118 (from ground 138 and indicated by arrow 140) and disc opener 114 (again from ground 138 and indicated by arrow 142). The remaining force (the sum of the force vectors indicated by arrows 134 and 136, minus the force indicated by arrows 140 and 142) and the force on any other ground engaging component on the row unit (not shown), is the differential force indicated by arrow 146. The differential force may also be referred to herein as the downforce margin. The force indicated by arrow 146 acts on the gauge wheels 116. This load can be sensed by a gauge wheel load sensor, which may be located anywhere on row unit 106 where it can sense that load. The gauge wheel load sensor can also be placed where it may not sense the load directly, but a characteristic indicative of that load. For example, it can be disposed near a set of gauge wheel control arms (or gauge wheel arm) 148 that movably mount gauge wheels 116 to shank 152 and control an offset between gauge wheels 116 and the discs in double disc opener 114, to control planting depth.

Arms (or gauge wheel arms) 148 illustratively abut against a mechanical stop (or arm contact member—or wedge) 150. The position of mechanical stop 150 relative to shank 152 can be set by a planting depth actuator assembly 154. Control arms 148 illustratively pivot around pivot point 156 so that, as planting depth actuator assembly 154 actuates to change the position of mechanical stop 150, the relative position of gauge wheels 116, relative to the double disc opener 114, changes, to change the depth at which seeds are planted.

In operation, row unit 106 travels generally in the direction indicated by arrow 160. The double disc opener 114 opens a furrow 162 in the soil 138, and the depth of the furrow 162 is set by planting depth actuator assembly 154, which, itself, controls the offset between the lowest parts of gauge wheels 116 and disc opener 114. Seeds are dropped through seed tube 120, into the furrow 162 and closing wheels 118 close the furrow 162, e.g., push soil back into the furrow 162.

As the seeds are dropped through seed tube 120, they can be sensed by seed sensor 122. Some examples of seed sensor 122 are described in greater detail below. Some examples of seed sensor 122 may include an optical or reflective sensor, which includes a radiation transmitter component and a receiver component. The transmitter component emits electro-magnetic radiation and the receiver component then detects the radiation and generates a signal indicative of the presence or absence of a seed adjacent the sensors. In another example, row unit 106 may be provided with a seed firmer that is positioned to travel through the furrow 162, after seeds are placed in furrow 162, to firm the seeds in place. A seed sensor can be placed on the seed firmer and generate a sensor signal indicative of a seed. Again, some examples of seed sensors are described in greater detail below.

This part of the present description proceeds with respect to the seed sensor being located to sense a seed passing it in seed tube 120, but this is for the sake of example only. Material application control system 113 illustratively receives a signal from seed sensor 122, indicating that a seed is passing sensor 122 in seed tube 120. It then determines when to actuate actuator 109 so that material being applied through application assembly 117 (and out distal tip 119 of application assembly 117) will be applied at a desired location relative to the seed in trench or furrow 162. Similarly, in an example where material is applied from tank 110, system 113 determines when to actuate motor 88 so the material being applied from tank 110 is applied at a desired location relative to the seed location. This is all described in greater detail herein as well. One brief example will be described now, by way of overview.

Material application control system 113 illustratively is programmed with, or detects a distance, e.g., a longitudinal distance, that the distal tip 119 is from the exit end 121 of seed tube 120. It also illustratively senses, or is provided (e.g., by another component, such as a GPS unit or a tractor, etc.), the ground speed of row unit 106. As the row units 106 on an implement being towed by a prime mover (e.g., a tractor) may move faster or slower than the tractor during turns, particularly as the width of the implement increases, the material application control system 113 may sense or be provided the ground speed of each row unit 106 of the implement. By way of example, the material application control system 113 may sense or be provided information when the implement is turning right indicating that the rightmost row unit 106 is travelling slower, i.e., has a lower ground speed, than the leftmost row unit 106. Further, the material application control system 113 detects, is provided, or is programmed with, system data indicating the responsiveness of actuator 109 and/or motor 88 and commodity meter 86, under certain conditions (such as under certain temperature conditions, certain humidity conditions, certain elevations, when spraying a certain type of fluid, or dispensing a certain granular material, etc.) and it also detects, is provided, or programmed with one or more properties of the material being applied through actuator 109 and commodity delivery system 98 (as this may affect the speed at which actuator 109 and/or system 98 responds, the time it takes for the material to travel through application assembly 117 to the distal tip 119 or delivered by system 98 and be applied to furrow 162, etc.). Further, material application control system 113 illustratively detects (or is provided with a sensor signal indicative of) the forward speed of row unit 106 in the direction generally indicated by arrow 160.

With this type of information, once system 113 receives a seed sensor signal indicating that a seed is passing sensor 122 in seed tube 120, system 113 determines the amount of time it will take for the seed to drop through the outlet end of seed tube 121 and into furrow 162 to reside at its final seed location and position in furrow 162. It then determines when tip 119 (or an outlet end of commodity delivery system 98—discussed below) will be in a desired location relative to that final seed location and it actuates valve 109 and/or commodity motor 88 to apply the material at the desired location in the furrow. By way of example, it may be that some material is to be applied directly on the seed. In that case, system 113 times the actuation of actuator 109 so that the applied material will be applied at the seed location. In another example, it may be desirable to apply some material at the seed location and also a predetermined distance on either side of the seed location. In that case, system 113 controls the signal used to control actuator 109 so that the material is applied in the desired fashion. In other examples, it may be that the material is to be applied at a location between seeds in furrow 162. By way of example, relatively high nitrogen fertilizer may be most desirably applied between seeds, instead of directly on the seed. In that case, system 113 has illustratively been programmed with the desired location of the applied material, relative to seed location, so that it can determine when to actuate actuator 109 and/or commodity motor 88 in order to apply the material between seeds. Further, as discussed above, actuator 109 can be actuated to dispense material at a varying rate. It can dispense more material on the seed location and less at locations spaced from the seed location, or vice versa, or according to other patterns.

It will be noted that a wide variety of different configurations are contemplated herein. For instance, in one example, FIG. 2 shows that actuator 109 may be placed closer to the distal tip 119 (such as indicated by actuator 109A and 109C). In this way, there is less uncertainty as to how long it will take the material to travel from the actuator 109A and 109C to the distal tip 119. In yet another example, the valve is disposed at a different location (such as on seed tube 120) as indicated by actuator 109B and 109D. In those scenarios, again, actuator 109B and 109D are closer to the distal tip 119 and the material may be applied before and/or after the seed drops into furrow 162. For instance, when seed sensor 120 detects a seed, system 113 may be able to actuate valve 109B or 109D to apply material to furrow 162, before the seed exits the exit end 121 of seed tube 120. However, by the time the seed drops through distal end 121 of seed tube 120, the final seed location may be directly on the applied material. In yet another example, system 113 can control actuator 109B or 109D so that it applies material, but then stops applying it before the seed exits distal end 121. In that case, the material may be applied at a location behind the seed in furrow 162, relative to the direction indicated by arrow 160. The same type of control can be performed for commodity motor 88, in dispensing material from tank 110. Commodity metering 86 may have a similar application assembly, similar to application assembly 117, so a distal tip 119 is located on row unit 106 to dispense the material from tank 110 at a desired location. Some examples are described below. This actuation timing enables the material to be applied between seeds, on seeds, or elsewhere. All of these and other configurations are contemplated herein.

Figure 3:
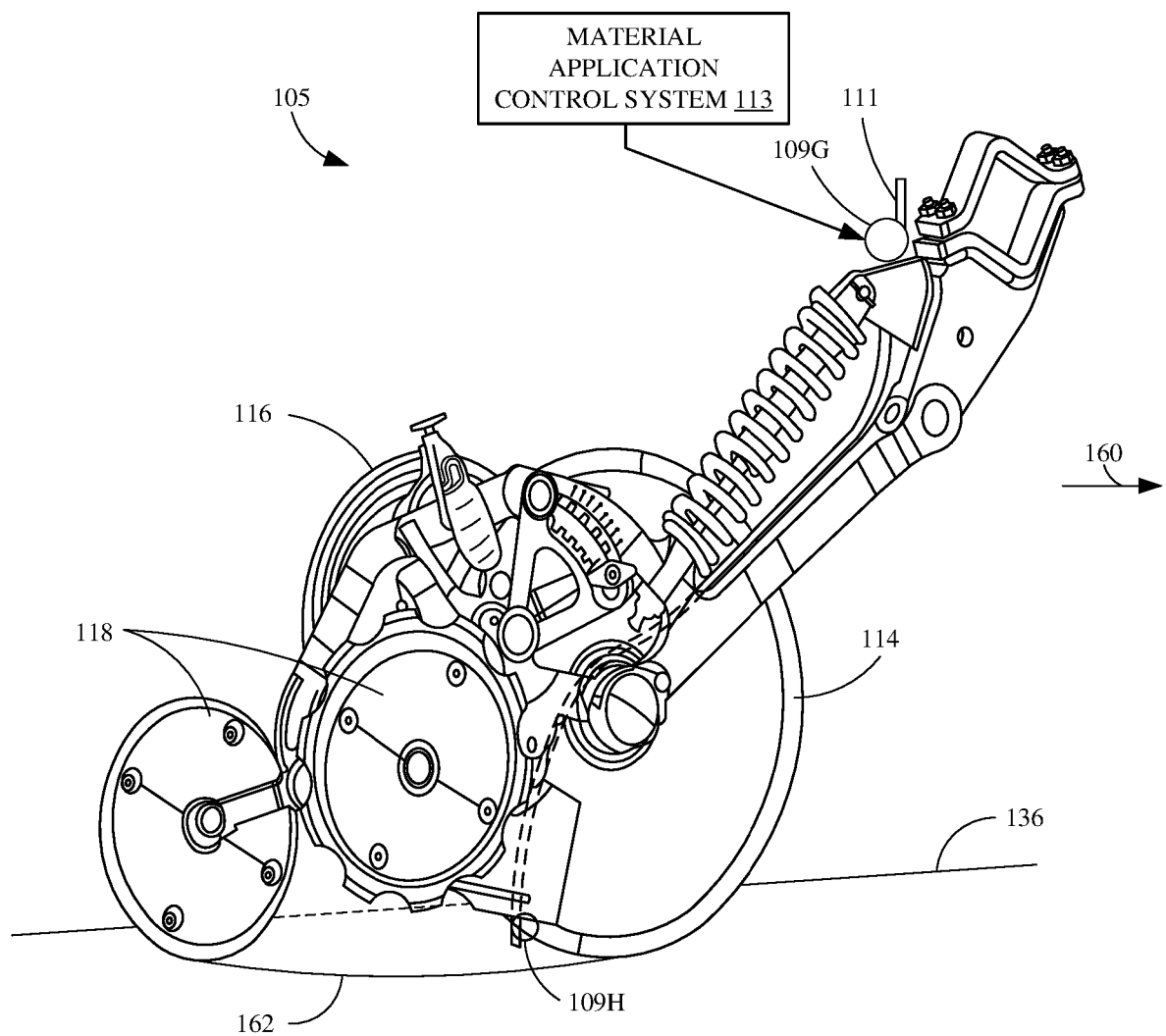
FIG. 3 is a view of an application unit.

FIG. 3 is a side perspective view of an applicator unit 105. Some items are similar to those shown in FIG. 2 and they are similarly numbered. Briefly, in operation, applicator unit 105 attaches to a side-dress bar that is towed behind a towing vehicle 94, so unit 105 travels between rows (if the rows are already planted). However, instead of planting seeds, it applies material at a location between rows of seeds (or, if the seeds are not yet planted, between locations where the rows will be, after planting). When traveling in the direction indicated by arrow 160, disc opener 114 (in this example, it is a single disc opener) opens furrow 162 in the ground 136, at a depth set by gauge wheel 116. When actuator 109 is actuated, material is applied in the furrow 162 and closing wheels 118 then close the furrow 162.

As unit 105 moves, material application control system 113 controls actuator 109 to dispense material. This can be done relative to seed or plant locations, if they are sensed or are already known or have been estimated. It can also be done before the seed or plant locations are known. In this latter scenario, the locations where the material is applied can be stored so that seeds can be planted later, relative to the locations of the material that has been already dispensed.

FIG. 3 shows that actuator 109 can be mounted to one of a plurality of different positions on unit 105. Two of the positions are shown at 109G and 109H. These are examples and the actuator 109 can be located elsewhere as well. Similarly, multiple actuators can be disposed on unit 105 to dispense multiple different materials or to dispense it in a more rapid or more voluminous way than is done with only one actuator 109.

Figure 4:
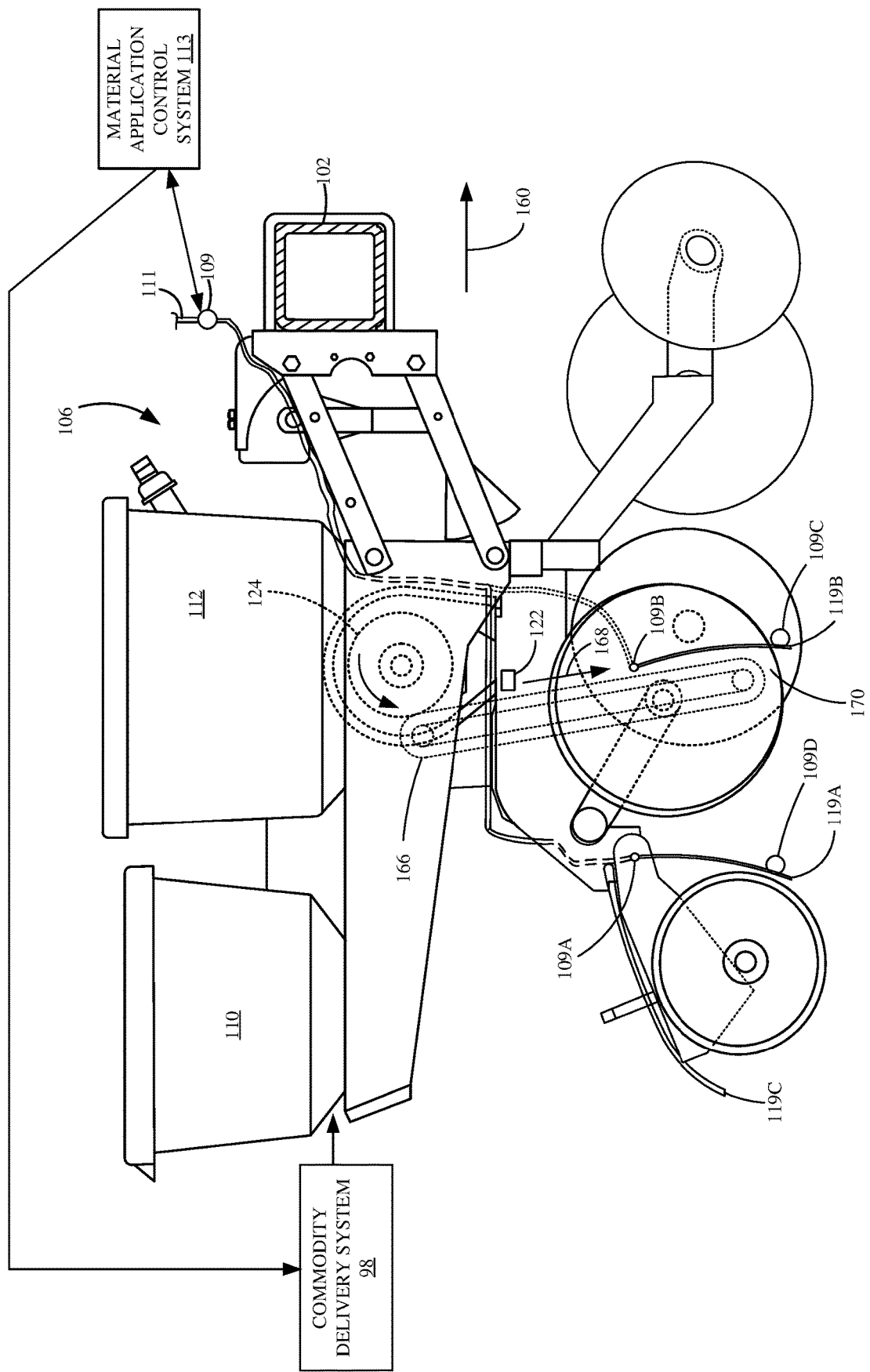
FIG. 4 is a side view showing another example of a row unit of the planting machine illustrated in FIG. 1.

FIG. 4 is similar to FIG. 2, and similar items are similarly numbered. However, instead of the seed delivery system being a seed tube 120, which relies on gravity to move the seed to the furrow 162, the seed delivery system shown in FIG. 4 is an assistive seed delivery system 166. Assistive seed delivery system 166 also illustratively has a seed sensor 122 disposed therein. Assistive seed delivery system 166 captures the seeds as they leave seed meter 124 and moves them in the direction indicated by arrow 168 toward furrow 162. System 166 has an outlet end 170 where the seeds exit assistive system 166, into furrow 162, where they again reach their final resting location.

In such a system, material application control system 113 considers the speed at which delivery system 166 moves the seed from seed sensor 122 to the exit end 170. In doing so, system 113 can consider the position of the delivery system 166 when the seed is detected and the position it will be in when the seed is delivered. Thus, system 113 can receive a sensor signal that senses the angular position of system 166 (e.g., the delivery mechanism itself or the motor driving it) when system 166 receives the seed. System 113 can then calculate the time it will take for seed delivery system 166 to rotate to a position where the seed exits delivery system 166. System 113 also illustratively considers the speed at which the seed moves from the exit end 170 into furrow 162. For instance, in one example the seed simply drops from exit end 170 into furrow 162 under the force of gravity. In another example, however, the seed can be ejected from delivery system 166 at a greater or lesser speed than that which would be reached under the force of gravity. Similarly, it may be that the seed drops straight downward into furrow 162 from the outlet end 170. In another example, however, it may be that the seed is propelled slightly rearwardly from the outlet end 170, to accommodate for the forward motion of the row unit 106, so that the travel path of the seed is more vertical and so the seed rolls less once it reaches the furrow. Further, the seed can be ejected rearwardly and trapped against the ground by a trailing member (such as a pinch wheel) which functions to stop any rearward movement of the seed, after ejection, and to force the seed into firm engagement with the ground. Again, FIG. 4 also shows that valve 109 can be placed at any of a wide variety of different locations, some of which are illustrated by values 109A, 109B, 109C and 109D. There can also be more than one seed sensor, seed sensors of different types, at different locations, etc.

Figure 5:
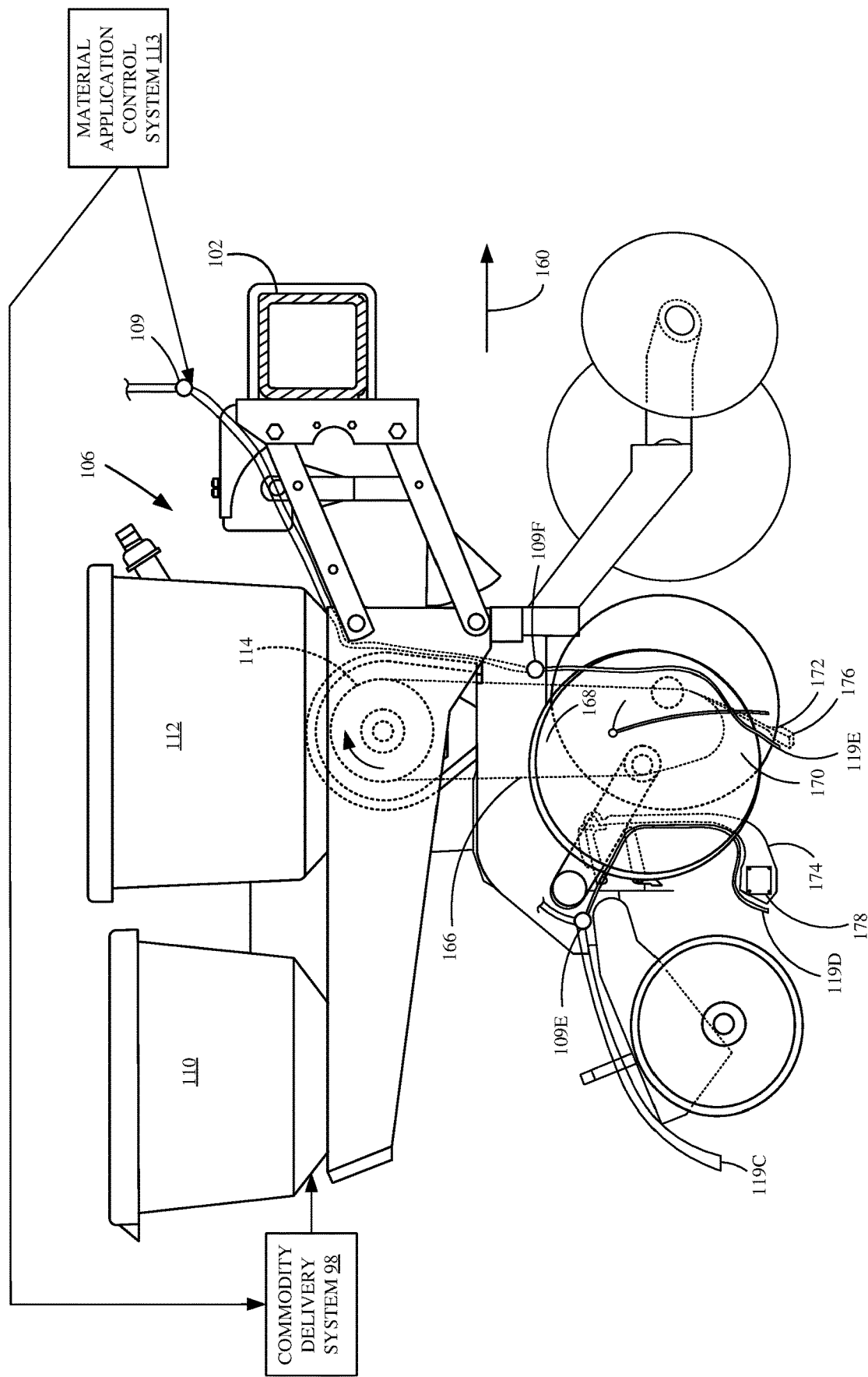
FIG. 5 is a side view showing another example of a row unit of the planting machine illustrated in FIG. 1.

FIG. 5 is similar to FIG. 4 and similar items are similarly numbered. However, in FIG. 5, row unit 106 is also provided with members 172 and/or 174. Members 172 and/or 174 can be spring biased into engagement with the soil, or rigidly attached to the frame of row unit 106. In one example, member 172 can be a furrow shaper, which contacts the soil in the area within or closely proximate the furrow, and immediately after the furrow is opened, but before the seed is placed therein. Member 172 can thus contact the side(s)

of the furrow, the bottom of the furrow, an area adjacent the furrow, or other areas. It can be fitted with a sensor 176, e.g., seed sensor 176, as well.

Member 172 can include a seed sensor 176, which senses the presence of the seed. It may be an optical sensor, which optically senses the seed presence as member 172 moves adjacent to, ahead of, or over the seed. It may be a mechanical sensor that senses the seed presence, or it may be another type of sensor that senses the presence of the seed in the furrow. Sensor 176 illustratively provides a signal to material application control system 113 indicating the presence of the sensed seed.

In such an example, it may be that actuator 109 is placed at the location of actuator 109E, shown in FIG. 5, and the outlet end of the application assembly 117 is shown at 119E. In the example shown in FIG. 5, outlet end 119E is shown closely behind member 172 relative to the travel direction indicated by arrow 160. It can be disposed on the opposite side of member 172 as well (such as forward of member 172 in the direction indicated by arrow 160). In such an example, the seed sensor senses the seed at a location that corresponds to its final seed location, or that is very closely proximate its final seed location. This may increase the accuracy with which seed sensor 176 senses the final seed location.

Also, in the example shown in FIG. 5, row unit 106 can have member 174 in addition to, or instead of, member 172. Member 174 can also be configured to engage the soil within, or closely proximate, the trench or furrow. It can have a seed sensor 178 that senses the presence of a seed (or a characteristic from which seed presence can be derived). It can be placed so that it closely follows the exit end 121 of the seed tube 120, or the exit end 170 of the assistive delivery system 166. The distal tip 119 of application assembly 117 can be positioned as shown at 119D, or elsewhere on the row unit 106. Also, actuator 109 can be placed at the position illustrated at 109F.

Figure 6:
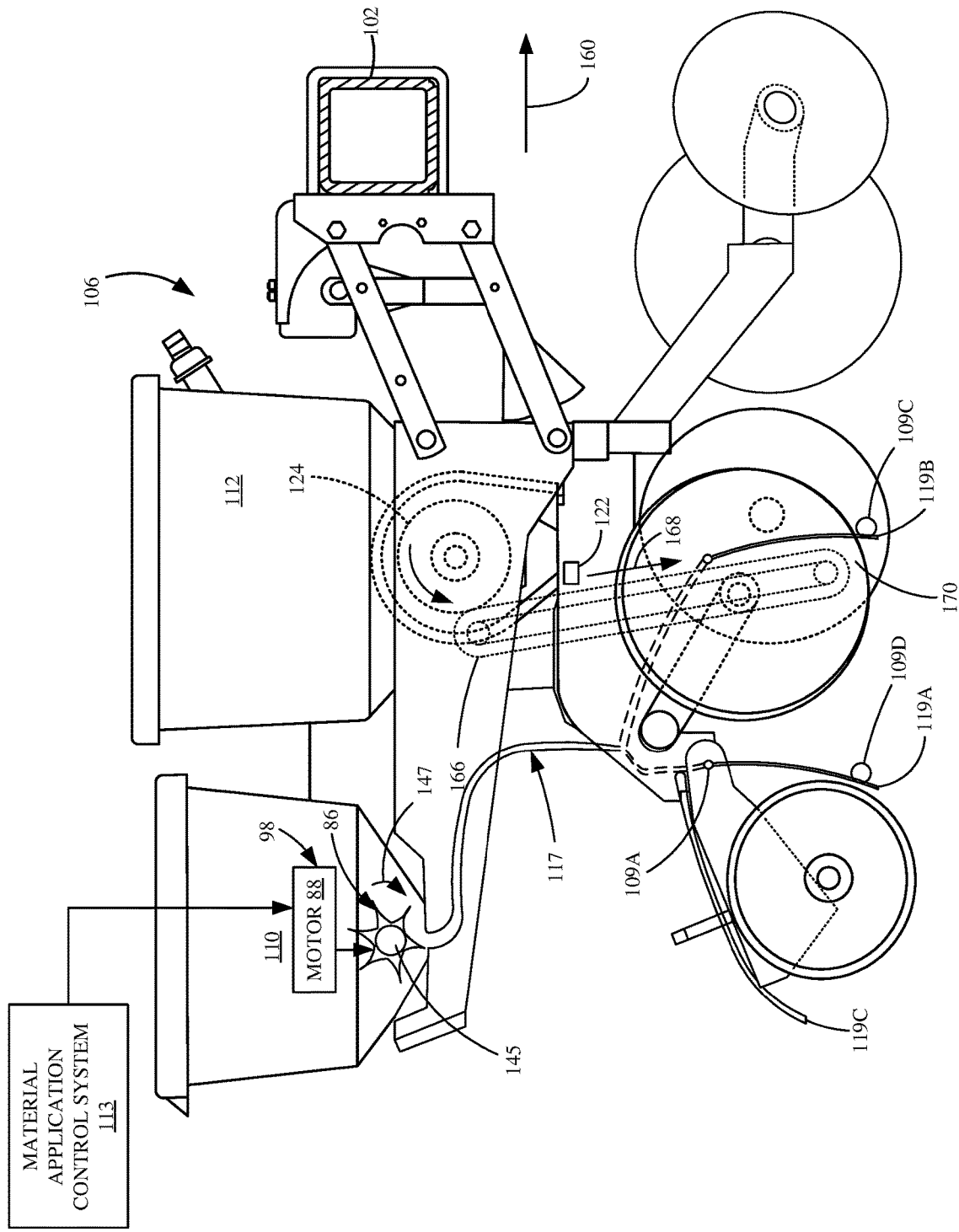
FIG. 6 is a partial schematic, partial pictorial view of a row unit of a planting machine illustrated in FIG. 1.

FIG. 6 is similar to FIG. 4 and similar numbers are similarly numbered. However, in FIG. 6, commodity meter 86 is shown as a flighted wheel 145 that is driven by motor 88 to rotate in the direction indicated by arrow 147. As wheel 145 rotates, it meters material from tank 110 to be dispensed into material application assembly 117. FIG. 6 shows that material application assembly 117 can be configured to receive the material dispensed by wheel 145 and deliver it to the distal tip 119 where it exits assembly 117 onto the ground at a desired location (e.g., given the location of distal tip—three locations, 119A, 119B and 119C are shown but others care contemplated herein). It will be noted that application assembly 117 can simply rely on gravity to force the material therethrough or it can be an assistive system in which pneumatic or other pressure assists the material therethrough. Assembly 117 can have valves 109, or another control mechanism, or it can simply be an open tube from wheel 145 to distal tip 119. Also, application assembly 117, shown in FIG. 6, can be used separate from, or in conjunction with, application assembly 117 shown in previous FIGS. so material can be dispensed from both tank 110 and from tank 107 using a single row unit 106.

Material application control system 103 can also control commodity motor 88 to dispense material at a desired location, relative to seed locations or otherwise, in the same or similar way as discussed above with respect to the previous FIGS. For instance, system 113 can consider when the seed will reach its final location and when the distal tip 119 will be at a desired position relative to the seed location. System 113 can consider how long it will take material from tank 110 to be dispensed out the distal tip once motor 88 is actuated to turn flighted wheel 145. System 113 can sense the angular position of motor 88 and the angular position of the motor driving speed delivery system 166, when the seed is detected, to coordinate when the material from tank 110 will reach the ground relative to when the seed reaches its final location. System 113 can consider the ground speed of machine 100 to determine when to actuate motor 88 as well. These are only examples.

Figure 7:
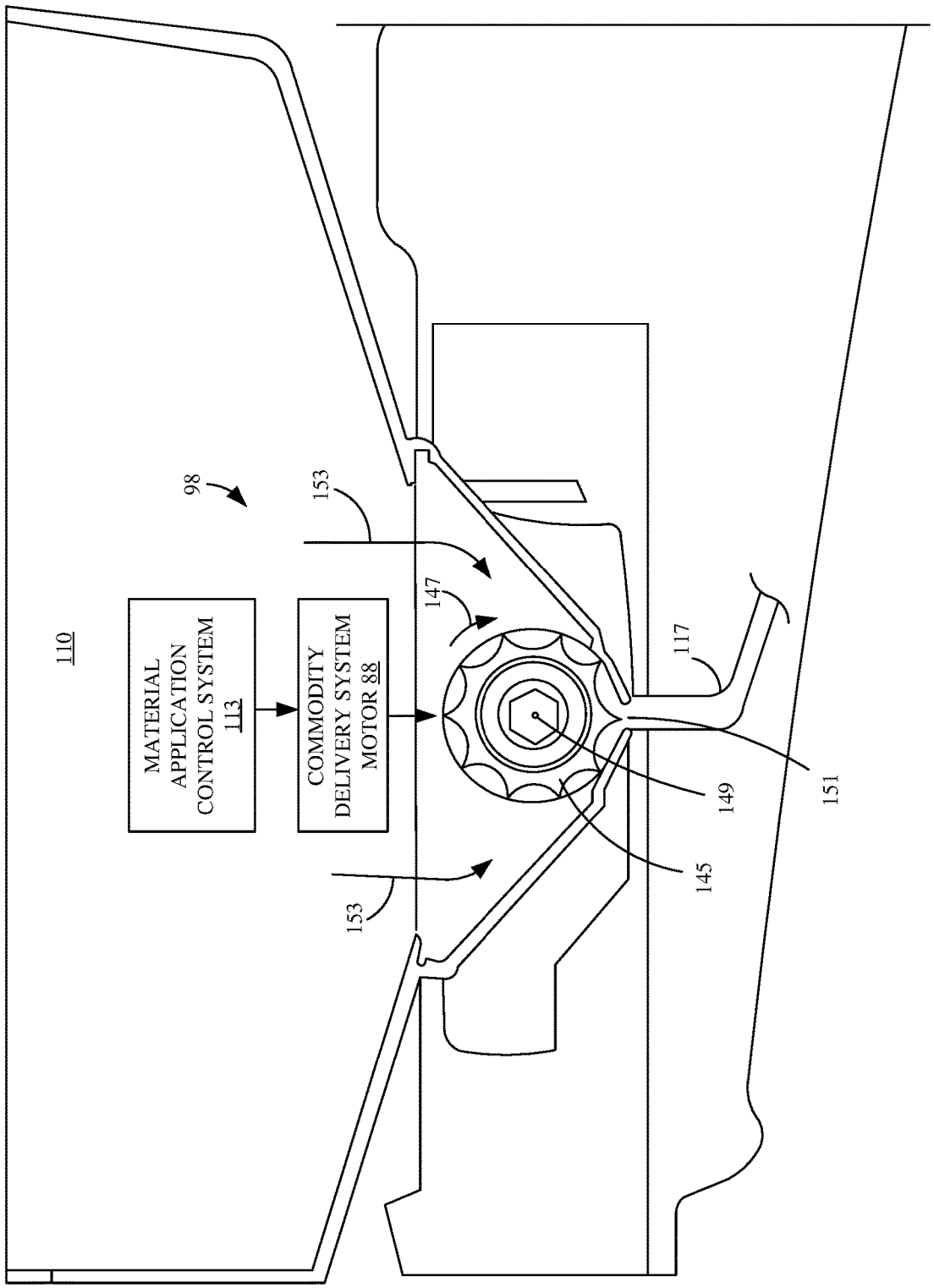
FIG. 7 is a side view of one example of a portion of a commodity metering system.

FIG. 7 shows an enlarged side view of a portion of commodity delivery system 98. In the example shown in FIG. 7, material application control system 113 and commodity delivery system motor 88 are shown in block diagram form. Motor 88 may be positioned relative to flighted wheel 145 so that it drives rotation of wheel 145 about a central axis 149. Motor 88 can be configured as a direct drive motor in which its output shaft directly drives rotation of wheel 145. Motor 88 can also be configured to drive wheel 145 through a transmission, such as a chain or belt drive mechanism.

FIG. 7 shows that the lower portion of tank 110 has an opening 151. Therefore, material in tank 110 moves downwardly under gravitational force, as indicated by arrows 153. As the material reaches wheel 145, the flights in wheel 145 act to meter the material in tank 110 into the opening 151, as wheel 145 rotates in the direction indicated by arrow 147. Based upon the size of the flights of flighted wheel 145, the amount of material that is metered into opening 151 with each flight can be varied. Also, the speed at which material is metered into opening 151 can be varied by varying the rotation speed of motor 88. Motor 88 can be any type of motor, such as an electrical motor, a hydraulic motor, etc. Also, as discussed above, application assembly 117 can be an open tube between opening 151 (in the lower end of tank 110) and the distal tip 119 of assembly 117. In another example, a pneumatic system can provide air, under pressure, to assist in the delivery of material through application assembly 117. The delivery of material can be performed in other ways as well.

Figure 8:
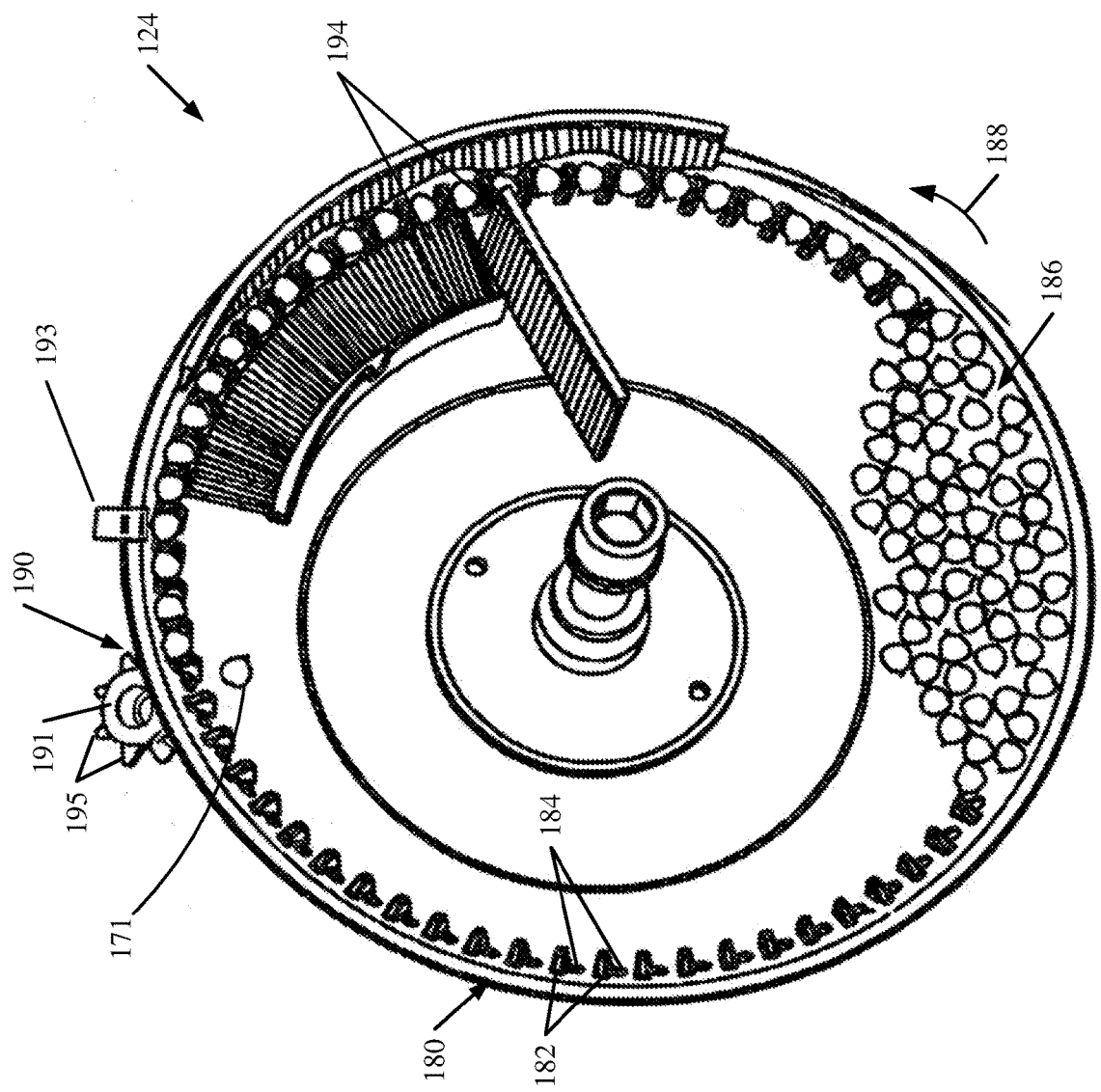
FIG. 8 is a perspective view of a portion of a seed metering system.

FIG. 8 shows one example of a rotatable mechanism that can be used as part of the seed metering system (or seed meter) 124. The rotatable mechanism includes a rotatable disc, or concave element, 180. Rotatable element 180 has a cover (not shown) and is rotatably mounted relative to the frame of the row unit 106. Rotatable element 180 has a plurality of projections or tabs 182 that are closely proximate corresponding apertures 184. A seed pool 186 is disposed generally in a lower portion of an enclosure formed by rotating mechanism 180 and its corresponding cover. Rotatable element 180 is rotatably driven by its motor (such as an electric motor, a pneumatic motor, a hydraulic motor, etc.) for rotation generally in the direction indicated by arrow 188, about a hub. A pressure differential is introduced into the interior of the metering mechanism so that the pressure differential influences seeds from seed pool 186 to be drawn to apertures 184. For instance, a vacuum can be applied to draw the seeds from seed pool 186 so that they come to rest in apertures 184, where the vacuum holds them in place. Alternatively, a positive pressure can be introduced into the interior of the metering mechanism to create a pressure differential across apertures 184 to perform the same function.

Once a seed comes to rest in (or proximate) an aperture 184, the vacuum or positive pressure differential acts to hold the seed within the aperture 184 such that the seed is carried upwardly generally in the direction indicated by arrow 188, from seed pool 186, to a seed discharge area 190. It may happen that multiple seeds are residing in an individual seed cell. In that case, a set of brushes or other members 194 that are located closely adjacent the rotating seed cells tend to remove the multiple seeds so that only a single seed is carried by each individual cell. Additionally, a seed sensor 193 can also illustratively be mounted adjacent to rotating element 180. It generates a signal indicative of seed presence and this may be used by system 113, as will be discussed in greater detail below.

Once the seeds reach the seed discharge area 190, the vacuum or other pressure differential is illustratively removed, and a positive seed removal wheel or knock-out wheel 191, can act to remove the seed from the seed cell. Wheel 191 illustratively has a set of projections 195 that protrude at least partially into apertures 184 to actively dislodge the seed from those apertures. When the seed is dislodged (such as seed 171), it is illustratively moved by the seed tube 120, seed delivery system 166 (some examples of which are shown above in FIGS. 2-6 and below in FIGS. 9-11) to the furrow 162 in the ground.

It will be noted that the motor that drives rotation of meter 124, or meter 124 itself, can be arranged relative to a sensor that generates a sensor signal indicative of the angular position of the motor or the meter 124 or another item from which the angular position of meter 124 can be derived. The angular position, along with the signal from seed sensor 193 and the speed of rotation of meter 124, can be used by system 113 to determine the position of the seed as it moves through the planter and into the ground. This can be used to control dispensing of material from tank 110 and/or tank 107. The sensor can be an angle encoder, a Hall Effect sensor, an optical sensor or any of a wide variety of other sensors that generate a signal indicative of angular position.

Figure 9:
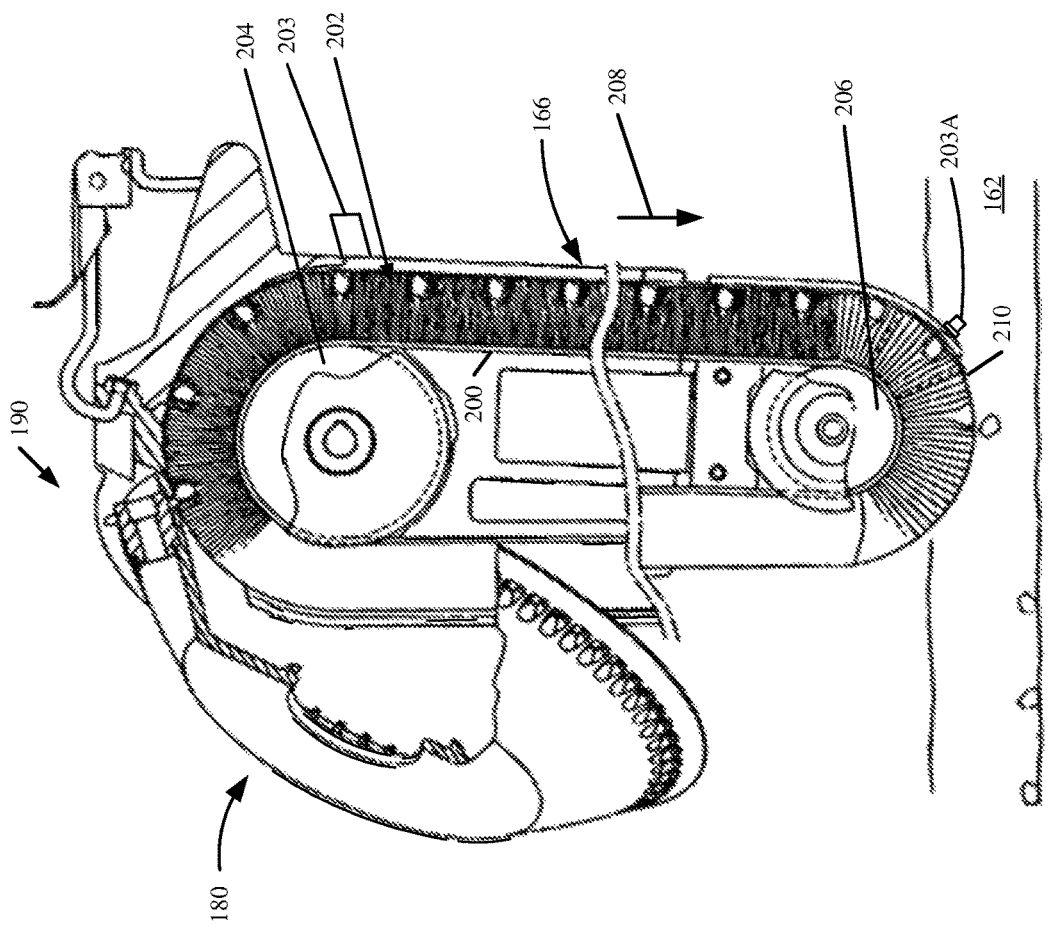
FIG. 9 shows an example of a seed delivery system that can be used with a seed metering system.

FIG. 9 shows an example of a seed metering system and a seed delivery system, in which the rotating element 180 is positioned so that its seed discharge area 190 is above, and closely proximate, seed delivery system 166. In the example shown in FIG. 9, seed delivery system 166 includes a transport mechanism, which may be a continuous mechanism such as a belt 200, with a brush that is formed of distally extending bristles 202 attached to belt 200 that act as a receiver for the seeds. Belt 200 is mounted about pulleys 204 and 206. One of pulleys 204 and 206 is illustratively a drive pulley while the other is illustratively an idler pulley. The drive pulley is illustratively rotatably driven by a conveyance motor, which can be an electric motor, a pneumatic motor, a hydraulic motor, etc. Belt 200 is driven generally in the direction indicated by arrow 208

Therefore, when seeds are moved by rotating element 180 to the seed discharge area 190, where they are discharged from the seed cells in rotating element 180, they are illustratively positioned within the bristles 202 by the projections 182 that push the seed into the bristles 202. Seed delivery system 166 illustratively includes walls that form an enclosure around the bristles 202, so that, as the bristles 202 move in the direction indicated by arrow 208, the seeds are carried along with them from the seed discharge area 190 of the metering mechanism, to a discharge area 210 either at ground level, or below ground level within a trench or furrow 162 that is generated by the furrow opener 114 on the row unit 106.

Additionally, a seed sensor 203 is also illustratively coupled to seed delivery system 166. As the seeds are moved within bristles 202, sensor 203 can detect the presence or absence of a seed. It should also be noted that while the present description will proceed as having sensors 122, 193 and/or 203, it is expressly contemplated that, in another example, only one sensor is used. Or additional sensors can also be used. Similarly, the seed sensor 203 shown in FIG. 9 can be disposed at a different location, such as that shown at 203A. Having the seed sensor closer to where the seed is ejected from the system can reduce error in identifying the final seed location. Again, there can be multiple seed sensors, different kinds of seed sensors, and they can be located at many different locations.

Also, in one example, the motor driving belt 200, or the belt 200 itself, can be configured relative to a sensor that generates a signal indicative of the angular position of the motor or belt 200. System 113 can use this signal, along with the seed sensor signal and the speed of rotation of belt 200 to determine when a sensed seed will arrive in the furrow.

Figure 10:
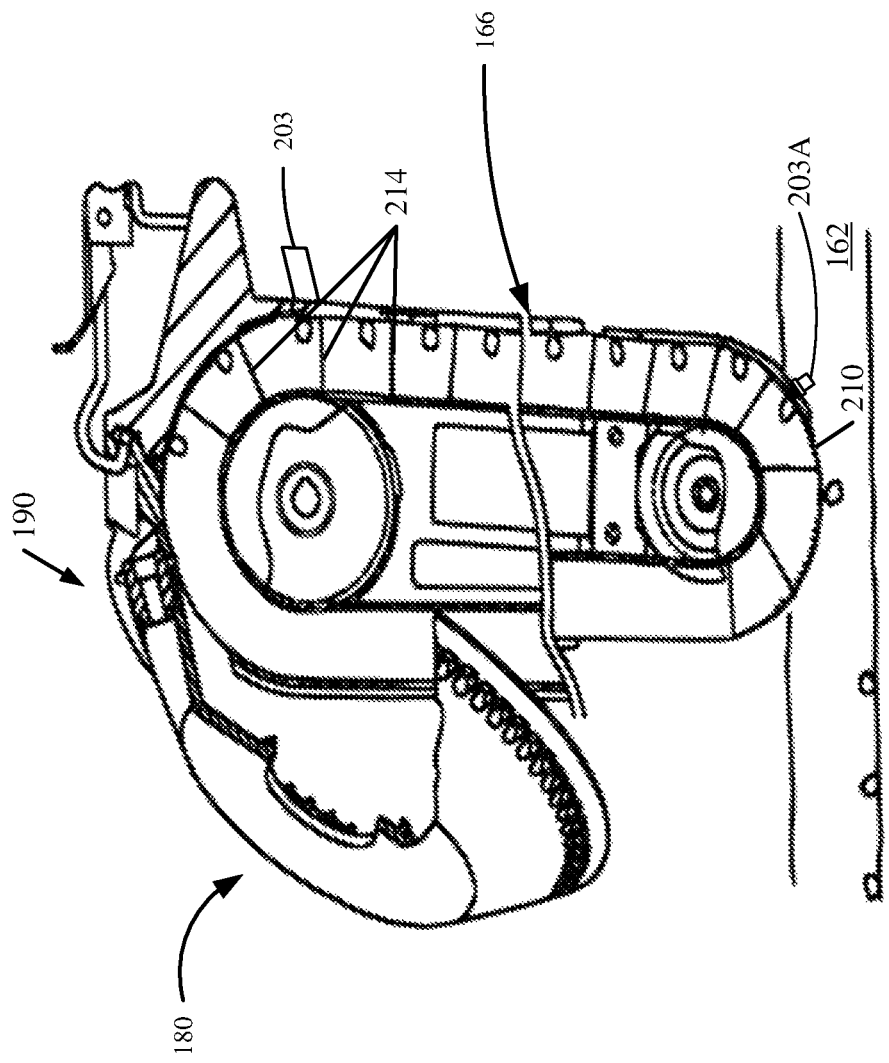
FIG. 10 shows another example of a delivery system that can be used with a seed metering system.

FIG. 10 is similar to FIG. 9, except that seed delivery system 166 does not include a belt with distally extending bristles. Instead, it includes a flighted belt (transport mechanism) in which a set of paddles 214 form individual chambers (or receivers), into which the seeds are dropped, from the seed discharge area 190 of the metering mechanism. The flighted belt moves the seeds from the seed discharge area 190 to the exit end 210 of the flighted belt, within the trench or furrow 162.

There are a wide variety of other types of delivery systems as well, that include a transport mechanism and a receiver that receives a seed. For instance, they include dual belt delivery systems in which opposing belts receive, hold, and move seeds to the furrow, a rotatable wheel that has sprockets, which catch seeds from the metering system and move them to the furrow, multiple transport wheels that operate to transport the seed to the furrow, and an auger, among others. The present description will proceed with respect to an endless member (such as a brush belt, a flighted belt) and/or a seed tube, but many other delivery systems are contemplated herein as well.

Figure 11:
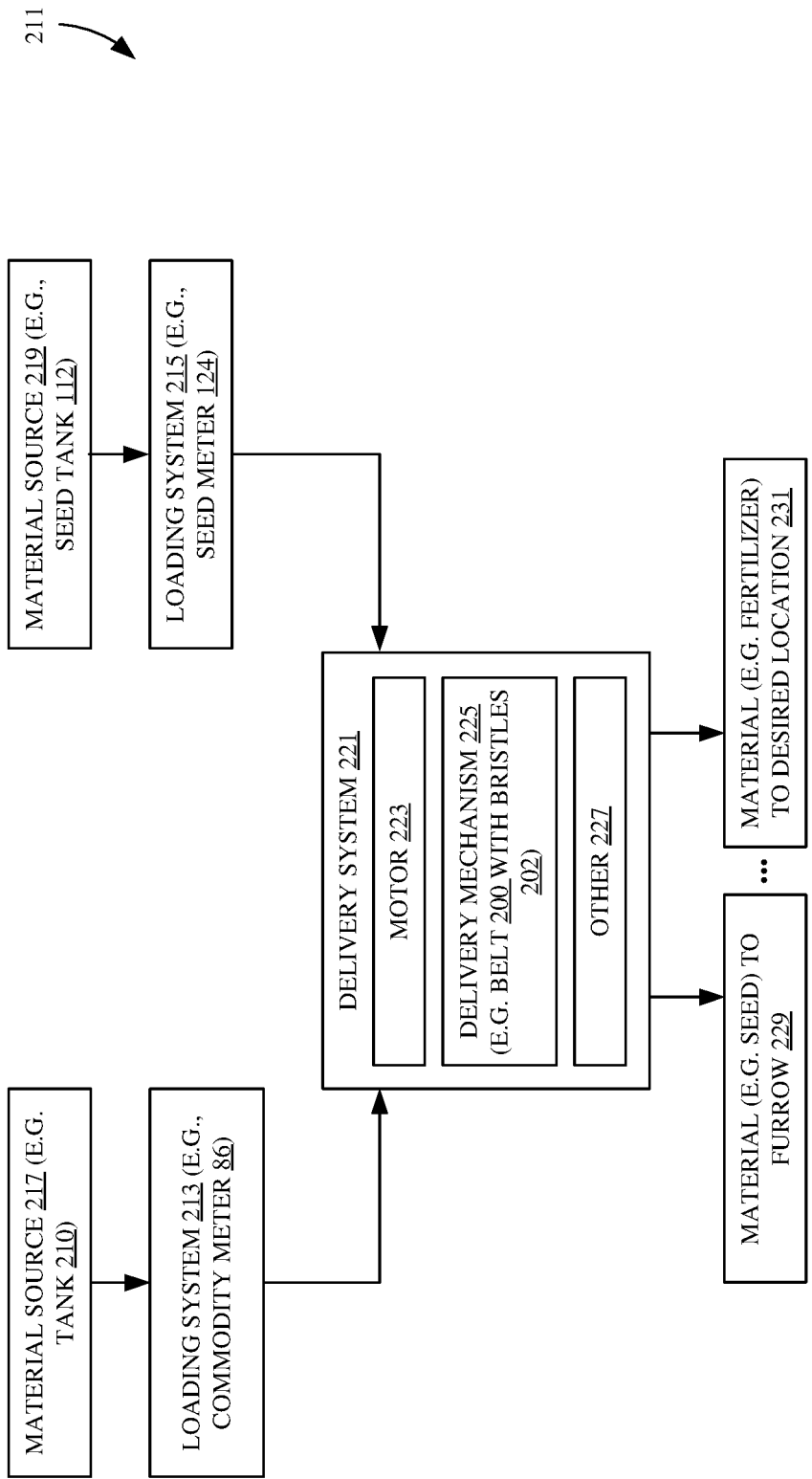
FIG. 11 is a block diagram of a plurality of loading systems loading a delivery system.

FIG. 11 shows a block diagram of one example of a dual loading architecture 211. Duel loading architecture 211 includes a plurality of different loading systems 213-215 that load material from different material sources 217-219, respectively, into a delivery system 221. Delivery system 221 illustratively includes a motor 223 and a delivery mechanism 225. It can include other items 227 as well. Delivery system 221 illustratively delivers the material from material source 219 to the furrow or ground as indicated by block 229, and the material from material source 217 to a desired location, as indicated by block 231. In one example, material source 217 is material tank 210 shown in the previous figures. Material source 219 may be the seed tank 112 shown in the previous figures. Also, in one example, the delivery mechanism 225 in delivery system 221 can be the belt 200 with bristles 202, as described above with respect to FIG. 9. Therefore, in one example, loading system 215 can be implemented as seed meter 124, which is also described above.

Thus, the operation of loading system 215, in loading seeds from source 219 into the delivery mechanism 225 has already been described. Loading system 213 may operate in a similar way where the material in material source 217 is a pellet (such as pelletized fertilizer, herbicide, pesticide, insecticide, etc.). It may be a different loading system 213 that is configured to insert material into the bristles 202 of belt 200, when the material is a granular material, or another type of material. However, in one example, loading systems 213 and 215 are offset relative to one another about the travel path of delivery mechanism 225. However, the motors driving loading systems 213 and 215 can be controlled so that the material loaded by loading system 213 is offset in delivery mechanism 225 by a desired amount relative to the material being loaded by loading system 215. For instance, assume that the material being loaded by loading system 215 is seed. Assume also that the material being loaded by loading system 213 is fertilizer. If the fertilizer is to be dispensed at the same location as the seed, then loading system 213 can be controlled to load the fertilizer at the same position in delivery mechanism 225 as the seeds. However, if the fertilizer is to be located between seeds, in the furrow, then loading system 213 can be controlled to load the fertilizer into delivery system 225 at a position that is offset from the seeds. Thus, when the seed is dispensed, the fertilizer will also be dispensed at a location that is linearly separated from the seed in the furrow.

In the example shown in FIG. 11, a single delivery mechanism 225 is thus used to deliver multiple different materials to the furrow. The loading systems 213 and 215, and also delivery system 221 can be driven by separate motors, or by a single motor that connects all three of the systems by a transmission. In one example, though, they are driven by separate motors and the motors are separately controllable, such as by material application control system 113. System 113 can thus control the motors to obtain a desired pattern of application of the material, relative to the seed, in the field being treated. This control can be accomplished as described above.

For instance, system 113 can determine the time lag between actuating the motors driving the two loading systems 213 and 215, and when those motors actually place material into the delivery mechanism 225. System 113 can also consider the speed of rotation of delivery mechanism 225 in determining how closely the materials should be loaded into the bristles 202 relative to one another. Delivery system 113 can also consider the travel speed of the planter 100 as well. Depending on whether the material and the seed are to be separated from one another, and depending on the distance of separation, and also depending on the ground speed of the planter 100, the motors driving systems 213, 215 and 221 can be controlled to obtain a desired pattern of material/seed on the ground.

In addition, system 113 can receive signals indicative of the angular position of the loading systems 213 and 215, as well as the angular position of delivery system 221. As discussed above, system 113 can use those angular positions, the speeds of rotation of the different loading systems 213, 215 and the speed of delivery system 221, in order to obtain the desired pattern of material/seed on the ground.

Before continuing with the description of applying material relative to seed location, a brief description of some examples of sensors 122, 193 and 203 will first be provided. Sensors 122, 193 and 203 are illustratively coupled to seed metering system 124 and seed delivery system 120, 166. They can also be coupled to systems 98 and/or 221. Sensors 122, 193 and 203 sense an operating characteristic of seed metering system 124 and seed delivery systems 120, 166 and/or systems 98 and 221. In one example, sensors 122, 193 and 203 are sensors that are each mounted at a sensor location to sense a seed within seed tube 120, seed metering system 124, and delivery systems 166 or to sense material in systems 98 and/or 221, respectively, as the seed or material passes the respective sensor location. In one example, sensors 122, 193, and 203 are optical or reflective sensors and thus include a transmitter component and a receiver component. The transmitter component emits electromagnetic radiation into seed tube 120, seed metering system 180, delivery system 166 and/or systems 98, 221. In the case of a reflective sensor, the receiver component then detects the reflected radiation and generates a signal indicative of the presence or absence of a seed or material adjacent to sensor 122, 193, and 203 based on the reflected radiation. With other sensors, radiation such as light, is transmitted through the seed tube 120, seed metering system 124, the delivery system 166 and/or systems 98, 221. When the light beam is interrupted by a seed or by material, the sensor signal varies, to indicate a seed or material. Thus, each sensor 122, 193, and 203 generates a sensor signal that pulses or otherwise varies, and the pulses or variations are indicative of the presence of a seed or material passing the sensor location proximate the sensor. When the delivery system is a dual loaded system, such as that shown in FIG. 11, the sensors may sense seed and fertilizer, but distinguish between the two based on their optical or other properties. In another example, the delivery mechanism 225 may be configured so the seed and material are offset relative to one another in a direction traverse to the direction of travel of mechanism 225 so that one sensor can be configured to sense the seed while another sensor senses the other material in the bristles 202 of belt 200. These and other arrangements are contemplated herein.

For example, in regards to sensor 203, bristles 202 pass sensor 203 and are colored to absorb a majority of the radiation emitted from the transmitter. As a result, absent a seed, reflected radiation received by the receiver is relatively low. Alternatively, when a seed (or other material) passes the sensor location where sensor 203 is mounted, more of the emitted light is reflected off the seed or other material and back to the receiver, indicating the presence of a seed or material. The differences in the reflected radiation allow for a determination to be made as to whether a seed is, in fact, present, or whether another material is present or whether neither seed nor other material are present. Additionally, in other examples, sensors 122, 193, and 203 can include a camera and image processing logic that allow visual detection as to whether a seed and/or other material is present within seed metering system 124, seed tube 120, and/or seed delivery system 166, at the sensor location proximate the sensor. They can include a wide variety of other sensors (such as RADAR or LIDAR sensors) as well.

For instance, where a sensor is placed on a seed firmer, it may be mechanical or other type of sensor that senses contact with the seed or other material as the sensor passes over the seed or material. Also, while the speed of the seed and/or other material in the delivery system (or as it is ejected) can be identified by using a sensor that detects the speed of the delivery system, in some examples, the speed and/or other characteristics of movement of the seed and/or other material can be identified using sensors. For instance, one or more sensors can be located to sense the speed of movement of the seed and/or other material, its trajectory or path, its instantaneous acceleration, its presence, etc. This can be helpful in scenarios in which the delivery system changes speed.

Sensors can also be configured to sense the flow of liquid and/or solid or granular material applied to the field. These sensors can generate sensor signals indicative of the flow rate of material, the pressure of material, the amount of material, etc.

Figure 12:
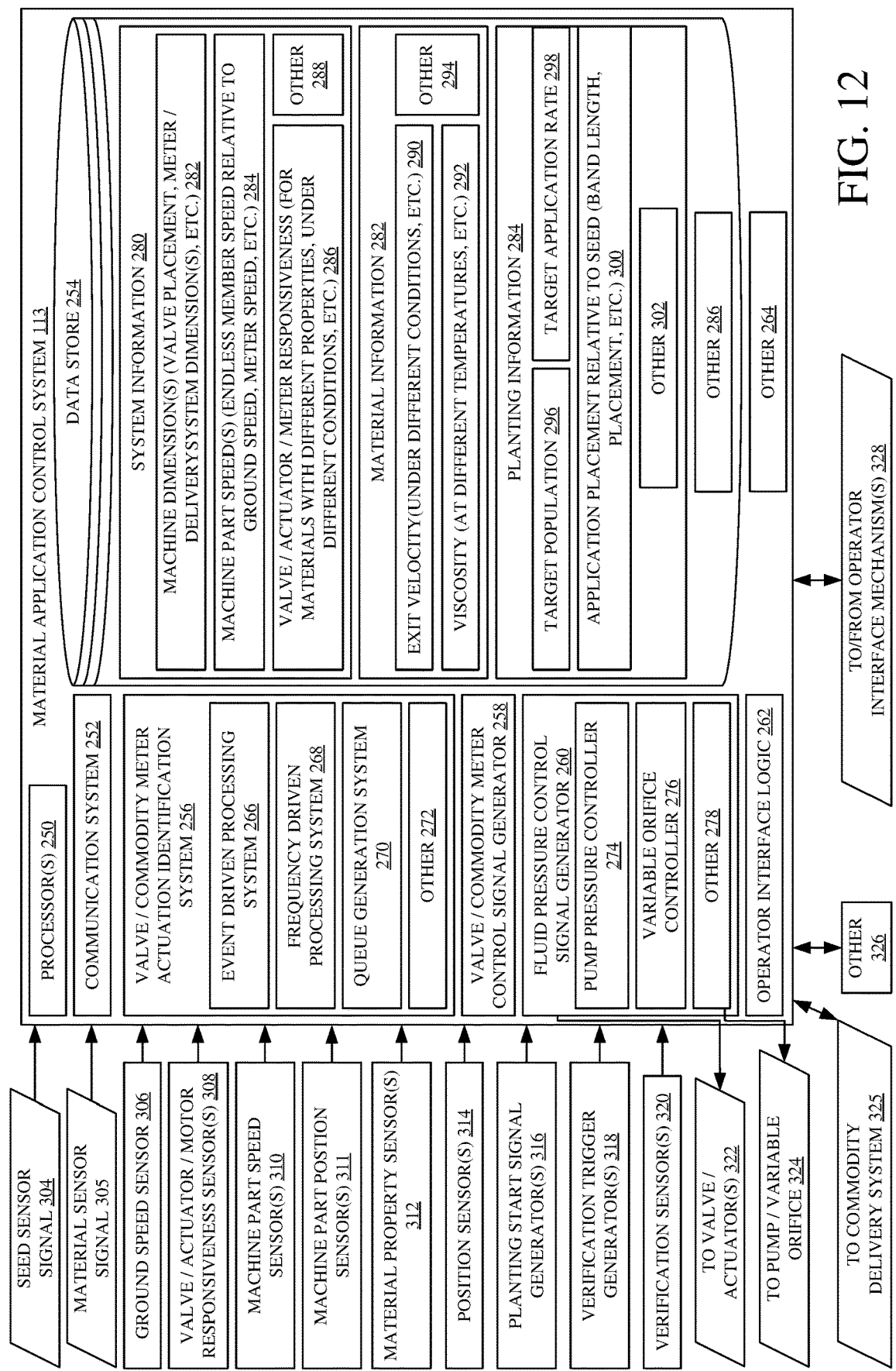
FIG. 12 is a block diagram showing one example of a material application control system.

FIG. 12 is a block diagram showing one example of material application control system 113 in more detail. In the example, it is assumed that actuators 109 are valves and that the material to be applied is pumped to actuators 109 by pump 115. In another example, it is assumed that the material being applied is material from tank 210 so that the commodity motor 88 is controlled to apply the material as desired. Of course, this is just one example and actuators 109 could be pumps or other actuators as well.

In the example shown in FIG. 12, system 113 illustratively includes one or more processors 250, communication system 252, data store 254, valve/commodity meter actuation identification system 256, valve/commodity meter control signal generator 258, fluid pressure control signal generator 260, operator interface logic 262, and it can include a wide variety of other items 264. FIG. 12 also shows that valve/commodity meter actuation identification system 256 can include event driven processing system 266 and/or frequency driven processing system 268. It illustratively includes queue generation system 270, and it can include a wide variety of other items 272. Fluid pressure control signal generator 260 illustratively includes pump pressure controller 274 and/or variable orifice controller 276. It can include other items 278 as well.

Data store 254 can include a wide variety of different types of information. The information can be pre-configured or pre-programmed into data store 254, or it can be sensed by sensors and stored in data store 254 intermittently (such as periodically, or it can be regularly updated based on those sensor inputs). By way of example, data store 254 illustratively includes system information 280, material information 282, planting information 284, and it can include a wide variety of other information 286. System information 280 illustratively includes information about the planter 100, the delivery system 98, 120, 166, 221 and/or other items that are used to plant seed. It includes information that can be used to identify when to apply material relative to the seed location of a seed in furrow 162. Therefore, it can include information that allows valve/commodity meter actuation identification system 256 to identify a timing of when the valves 109 and/or commodity motor 88 should be actuated to apply the material, relative to the seed location.

As examples, system information 280 can include machine dimensions 282. These dimensions can include dimensions that indicate where the valve and/or commodity meter 86 are placed relative to the outlet opening of the seed delivery system. It can include dimensional information indicating where the valve and/or commodity meter 86 are placed relative to the sensors. It can include dimensions of the commodity delivery system 98 as well. It can include information such as the size, e.g., one or more dimensions, of the seed delivery system 120, 166, so that the distance between the seed sensor and the furrow 162 can be identified. It can include a wide variety of other machine dimension information 282 as well.

System information 280 can also include machine part speed information 284. This information can include the speed of an endless member used to deliver seed (such as the brush belt 200 delivery system or the flighted belt 214 delivery system), and the speed of flighted wheel 145. Where the speed of those mechanisms changes with the ground speed of the planter, information 284 can identify the different belt/wheel speeds relative to this sensed ground speed or provide a correlation so the belt/wheel speed can be calculated given the ground speed. It can include other machine part speed information as well such as the speed of metering system 124, etc.

System information 280 also illustratively includes valve/actuator/motor responsiveness information 286. Information 286 can indicate the responsiveness of the actuator 109 and/or motor 88 that is being used to apply the material. In one example, the actuator 109 may be a solenoid valve so that there is a latency between when a valve open signal is applied and when the solenoid actually opens the valve. The same is true for closing the valve. That is, there may be a latency between when the valve close signal is applied and when the valve actually closes. There may be a latency between when motor 88 is commanded to turn on or off and when the commanded action occurs. In addition, the actuator responsiveness may change based upon the particular properties of the material that is flowing through the valve or being metered by flighted wheel 145 and moving through application assembly 117. It may change based upon the type of nozzle that is being used, and it may change under different ambient conditions (e.g., it may take longer to cycle when the weather is cold than when the weather is warm, etc.). The valve/actuator/motor responsiveness information 286 can indicate valve/motor responsiveness given these and other types of information. System information 280 can include a wide variety of other information 288, as well.

Material information 282 illustratively identifies properties of the material that is being applied by the system. For instance, material information 282 may include exit velocity information 290 that identifies a velocity at which the material exits the valve or nozzle or flighted wheel that is being used to apply it. Again, the exit velocity of the material may change based on the material, under different conditions, and the exit velocity information 290 may indicate this as well.

Where the material is a liquid material, then material information 282 may also include viscosity information 292, which identifies the viscosity or other liquid properties of the material. The viscosity may change at different temperatures or under other circumstances, and viscosity information 292 will illustratively indicate this. The material information 282 can include a wide variety of other information 294 (such as granule size or pellet size when the material is granular or pelletized) indicative of other properties of the material being applied.

Planting information 284 can include a wide variety of different types of information indicative of the planting operation. For example, it can include target population information 296 that identifies a target seed population. It can include target application rate information 298 that indicates a target application rate for the material being applied. It can include application placement relative to seed information 300 that indicates placement properties of the application, or application pattern, for the material. For instance, where the material is liquid or granular material and is being applied in a band of liquid or granules, it may indicate the length of each application band to be applied by the valve or actuator or flighted wheel. It may indicate a placement of that band relative to the seed location. For instance, where the band is to be four inches long, the placement information may indicate a relative placement of the center of the band (along its longitudinal length) relative to seed location. In this way, where the material is to be applied at the seed location, then the center of the band will illustratively correspond to the seed location. However, where the material is to be applied at a location other than the seed location, then the center of the band will illustratively be offset from the seed location by a desired amount. Similarly, the application rate may vary within an application band. For instance, the material may be applied more heavily near the center of the band than at either end of the band or vice versa. This type of information can be included in information 300. The planting information 284 can include a wide variety of other information 302, indicative of the planting operation, as well.

FIG. 12 also shows that material application control system 113 illustratively receives one or more seed sensor signals 304 that may be generated from one or more of seed sensors 122, 193 or 203, or another seed sensor located at a different location. Seed sensor signal 304 may illustratively indicate when the particular sensor senses the presence of a seed. A material sensor signal 305 can indicate the material to be applied, such as material exiting flighted wheel 145 or material moving through or exiting application assembly 117.

FIG. 12 also shows that, in one example, system 113 includes an input from ground speed sensor 306, which senses the ground speed of row unit 106. The sensor may be located on the towing vehicle or elsewhere, and illustratively provides a sensor signal indicative of ground speed.

As discussed above, some of the information stored in data store 254 may be pre-configured or pre-defined or downloaded from a remote server. In another example, it may be sensed by various sensors. Therefore, in one example, system 113 receives the valve/actuator/motor responsiveness information 286 from a valve/actuator/motor responsiveness sensor 308. Sensor 308 may illustratively sense the movement of a solenoid, or motor or other actuator, to sense how responsive the actuator or valve or motor is to the control signals that are applied to it. Thus, it may provide a signal indicative of the latency between applying a valve open signal (or pump on signal) and when the valve actually opens (or the pump turns on), and indicative of latency between applying a valve close signal (or pump off signal) and when the valve actually close (or the pump turns off), or it may be indicative of the latency between when a motor on/off signal is received by or applied to the motor and when the motor output shaft begins or stops turning, among other things.

The machine part speeds information 284 may also be sensed by machine part speed sensors 310. Those sensors may illustratively sense the speed at which the seed delivery system 166 is moving, the speed at which the seed metering system 124 is moving, the speed at which flighted wheel 145 is moving, the speed at which material is moving (or being propelled) through application assembly 117, or the speed of a wide variety of other machine parts that are needed to apply material, as desired.

System 113 can also receive an input from machine part position sensor 311. Sensor 311 can sense the position of various parts of the various systems. In one example, sensors 311 sense a variable indicative of the position of the flighted wheel 145, belt 200, meter 124 and/or other parts. To do this, sensor 311 can be sensors that sense the angular position of the parts themselves or the motor output shafts that drive the motors or other parts.

Similarly, the material information 282 can be sensed as well, by material property sensors 312. Those sensors may sense such things as material temperature, material viscosity, among other things.

System 113 can also receive an input from a position sensor 314. Position sensor 314 may include a GPS system, a LORAN system, a cellular triangulation system, a dead reckoning system or another type of position system that provides a signal indicative of the position of the sensor 314 in a global or local coordinate system. Such a sensor can also be used to determine ground speed, among other things.

System 113 also illustratively receives an input from a planting start signal generator 316. Generator 316 can cause any of a wide variety of different signals from any of a wide variety of different sensors, actuators or control inputs, indicating that the planting operation has begun. For instance, it may be that the operator 92 of the towing vehicle 94 depresses a button or provides another input through a user interface mechanism 96 to start the planting operation. This may be sensed by signal generator 316 and used to generate a signal indicating that the planting operation has begun. In another example, generator 316 may include a sensor indicating that either metering system 124 or seed delivery system 166 has begun moving. In another example, generator 316 may include a sensor indicating that a seed has passed the sensors 122, 193 and/or 203. It may generate a signal based on this, which is indicative of the planting operation beginning.

System 113 can also receive an input from verification trigger generator 318. Generator 318 provides an input, under certain circumstances, which are described in greater detail elsewhere herein, indicating when system 113 is to perform a verification operation, especially where frequency driven processing system 268 is used.

When a verification operation is to be performed, signals may be received by system 113 from a variety of different verification sensors 320. Examples of these sensors are described elsewhere herein.

Valve/commodity meter control signal generator 258 illustratively generates control signals 322 and/or 325 that are sent and/or applied to the valves or actuators 109 and/or commodity delivery system 98 in order to apply the material. This is also described in greater detail herein.

In some examples, the material being applied is a fluid that is provided as fluid under pressure by pump 115. In that case, the pump displacement may be controlled to control the pressure. Similarly, the valves or nozzles may be provided with a variable orifice. In that case, the variable orifice may be controlled as well. Therefore, fluid pressure control signal generator 260 illustratively generates outputs 324 that illustratively control the pump and/or variable orifice, in those scenarios. In a scenario in which actuators 109 are pumps, outputs 324 can control those pumps as well.

System 113 can include a wide variety of other inputs and it can generate a wide variety of other outputs as well. This is indicated by block 326.

FIG. 12 also shows that, in one example, operator interface logic 262 may generate signals that are output to operator interface mechanisms 96, and it can receive information from those mechanisms as well. This is indicated by block 328.

Before describing the overall operation of material application control system 113, a brief description of some of the items in system 113 will first be provided. Communication system 252 can be any of a wide variety of different types of communication systems that allow material application control system 113 to communicate with a control system on towing vehicle 94 and/or operator interface mechanisms 96. It can also allow items on system 113 to communicate with one another, and to communicate with one or more different remote computing systems. Therefore, for instance, communication system 252 can include a controller area network—CAN—communication system, a local area network, a wide area network, a near field communication system, a cellular communication, or any of a wide variety of other networks or combinations of networks and communication systems.

Valve/commodity meter actuation identification system 256 illustratively receives some of the inputs discussed above and identifies when the valves 109 and/or motor 88 are to be actuated in order to apply material at a desired location relative to the location of the seeds being placed in furrow 162. In one example, it includes event driven processing system 266, which determines when the valves and/or motor 88 are to be actuated based on an event, such as based upon receiving an indication from seed sensors signal 304 that a seed has been sensed. For instance, referring to FIGS. 4 and 6, assume that seed sensor 122 detects a seed in delivery system 166. Event driven processing system 266 calculates a time that it will take that seed to travel to the outlet end 170 of delivery system 166, based upon the speed of delivery system 166, as indicated by machine part speed sensors 310. It then calculates a time delay, during which the seed will move from the outlet end 170 of the seed delivery system 166 to its final resting place is furrow 162. Then, based upon the location of the valve 109 on row unit 106, the valve/actuator responsiveness, the exit velocity or viscosity of the material being applied, the ground speed of row unit 106, and based upon the desired placement of the material relative to the seed location (as indicated by the corresponding information in data store 254 or based on the inputs from the sensors discussed above), event driven processing system 266 calculates when the valves 109 should be actuated in order to apply the material at the desired place, relative to the seed location. In a similar way, system 266 calculates when motor 88 should be actuated so flighted wheel 145 (or other commodity meter 86) can deliver material from tank 110 to the desired place, relative to the speed location.

In another example, valve/commodity meter actuation identification system 256 can include frequency driven processing system 268. Frequency driven processing system 268 need not necessarily receive an input from a seed sensor, but instead is a controlled system, e.g., a highly controlled system, that knows the speeds of the various parts of row unit 106, it knows the valve/flighted wheel placement on row unit 106, their responsiveness, the travel times of material through the application assembly 117 and onto the ground, and the material properties. Therefore, frequency driven processing system 268 knows, in an a priori fashion, when seeds will be placed in the furrow 162, and thus when to actuate the valves 109 and/or motor 88. In such a tightly controlled system, frequency driven processing system 268 simply needs to know when the planting operation begins, e.g., when the first seed is deposited into the furrow 162. It can then calculate the theoretical time when seeds will be deposited in the furrow, and thus when to actuate the valves and/or motor 88 to apply the material at the desired location relative to the seeds. Therefore, in that scenario, system 268 receives a signal from planting start signal generator 316, which is indicative of when the planting operation begins. Based on that information, frequency driven processing system 268 calculates when the valves 109 are to be actuated and/or when motor 88 is to be actuated and provides an indication of that to valve/commodity meter control signal generator 258, which generates the corresponding valve/motor control signals.

Also, in one example, it may be that frequency driven processing system 268 occasionally verifies that it is actuating the valves and/or motor 88 according to the correct pattern, e.g., that the timing calculated by the system 268 aligns properly with the deposition of seeds into the furrow 162 (relative to the seeds in the furrow 162). In that case, frequency driven processing system 268 may intermittently receive an input from seed sensor signal 304 identifying where an actual seed was sensed. It can then determine whether the a priori pattern it is using to actuate valves 109 and/or motor 88 is correct based upon the actual seed sensor signal. In some examples, the frequency driven processing system 268 uses a periodically sensed single seed (e.g., the seed sensor signal 304 identifies and reports a single seed in one or more of space and time). In some examples, the frequency driven processing system 268 uses a periodically sensed multiple seeds (e.g., the seed sensor signal 304 identifies and reports multiple seeds, such as strings of 2 seeds, 3 seeds 4 seeds 5 seeds, 6 seeds, or any other number of seeds necessary or helpful to the frequency driven processing system 268). In some examples, the frequency of verification by the frequency driven processing system 268 is loosely inversely related to the number of seeds reported by the seed sensor signal 304. For example, verification may occur more frequently when only a single seed is sensed and reported, whereas verification may occur less frequently when two or more seeds are sensed and reported. If a correction is needed, then it can make that correction to the pattern it is using, and use the corrected pattern going forward. The frequency driven processing system 268 can intermittently re-verify that pattern as well.

Thus, in one example, frequency driven processing system 268 receives an input from verification trigger generator 318 indicating that a verification operation is to be performed. The triggers can include one or more of a wide variety of different triggers (the system may be initiated by a single trigger or it may be initiated when only two or more triggers are received). For instance, the system may be triggered to verify its a priori pattern after a certain number of seeds have been planted (the number of seeds may be identified substantially exactly using a seed sensor, or the number of seeds may be estimated or calculated using system inputs, such as, but not limited, to seed population and prime mover travel speed). It may be triggered after a certain distance has been traveled by row unit 106 (as mentioned, the triggering distance may vary based on the set seed population, e.g., a higher seed population may trigger the system after a shorter distance than a lower seed population). It may be triggered after a specific time has elapsed. These are just examples of triggers. Once the verification operation has been triggered, then frequency driven processing system 268 may receive other sensor signal inputs from verification sensors 320, that are used to verify the pattern that system 268 is using to apply the material. Some of these are discussed in greater detail elsewhere herein.

In another example, queue generation system 270 generates a set of valve actuation timing signals, indicating when valves 109 should be actuated, for a future sequence of actuations and/or motor actuation signals, indicating when motor 88 is to be actuated, for a future sequence of times. For instance, queue generation system 270 may generate a queue of timing signals that are generated either by event driven processing system 266 or frequency driven processing system 268, and provide that plurality of queued timing signals to valve/commodity meter control signal generator 258. Valve/commodity meter control signal generator 258 can receive that set of signals and generate valve/motor control signals based upon the queued sequence of timing signals. In this way, the network bandwidth for communication between valve actuation identification system 256 and valve/commodity meter control signal generator 258 need not be as high. By communicating a plurality of valve/motor actuation timing signals as a queued sequence of signals, the frequency with which those signals need to be sent can be greatly reduced over an implementation in which each valve/motor actuation timing signal is sent, individually and separately, for each valve/motor actuation.

Valve/commodity meter control signal generator 258 can generate the valve/motor control signals in a wide variety of different ways. It can generate those signals and apply them through a hardware wiring harness, through wireless communication, or in other ways.

In some examples, when the material to be applied is fluid, the fluid pressure of the material to be applied is to be controlled. For instance, by increasing the fluid pressure, this may increase the exit velocity of the material as it is applied by the valve or nozzle being controlled. Similarly, where the valve or nozzle is not directed vertically, but has a horizontal component to its orientation, increasing the fluid pressure may change the trajectory of the fluid after it exits the valve or nozzle. This will change the location on the ground where the material is applied.

In the same way, where the valve or nozzle is provided with a variable orifice, varying the orifice may change the trajectory or exit velocity of the material as well. Thus, pump pressure controller 274 can control the pump pressure to obtain a desired exit velocity and/or trajectory of the material being applied. Variable orifice controller 276 can variably control the orifice to also achieve a desired exit velocity and/or trajectory of the applied material. In some examples, variable orifice controller 276 and pump pressure controller 274 can work in concert to control the exit velocity and/or trajectory of the material being applied.

Operator interface logic 262 can generate information that is provided to operator interface mechanisms 96 so that operator 92 can interact with that information. Similarly, operator interface logic 262 can receive information indicative of operator inputs from operator 92 through operator interface mechanisms 96. It can communicate that information to the various items or components on/of material application control system 113.

Figure 13:
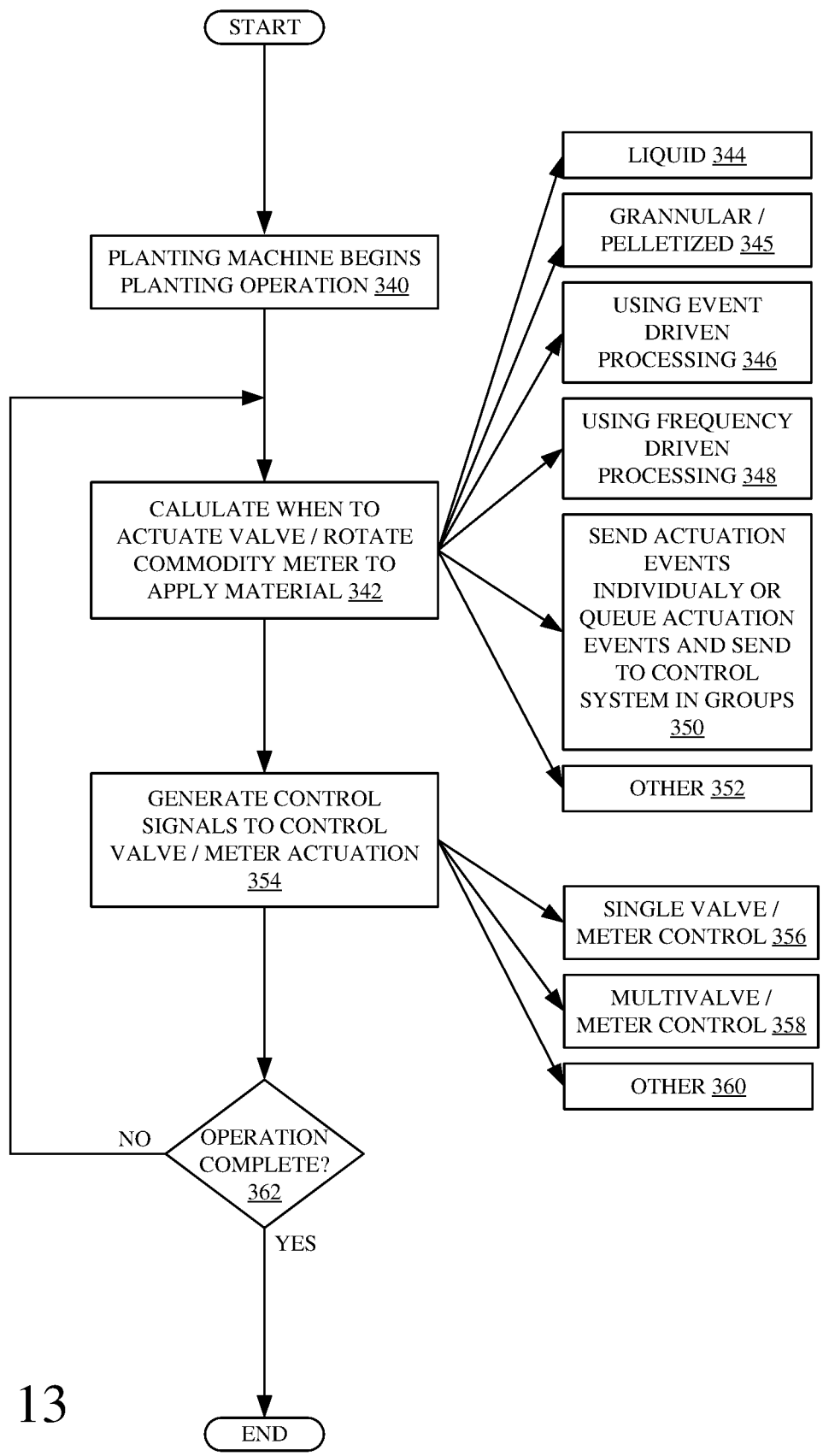
FIG. 13 is a flow diagram illustrating one example of the operation of the material application control system shown in FIG. 12.

FIG. 13 is a flow diagram illustrating one example of the overall operation of material application control system 113. It is first assumed that the planting machine (e.g., row unit 106) begins the planting operation. This is indicated by block 340 in the flow diagram of FIG. 13. Based upon the various inputs, valve/meter actuation identification system 256 calculates when to actuate the valves and/or meter to apply the material relative to the seed location in the furrow 162. This is indicated by block 342. In one example, the material can be liquid. This is indicated by block 344. In another example, it can be granular or pelletized. This is indicated by block 345. In one example, system 256 can determine when to actuate the valves/meter using event driven processing system 266. This is indicated by block 346 in the flow diagram of FIG. 13. In another example, system 256 can determine when the valves/meter are to be actuated using frequency driven processing system 268. This is indicated by block 348. In one example, frequency driven processing system 268 can be used in conjunction with event driven processing system 266. Further, the timing indicators, indicating when the valves 109 and/or commodity meter 86 (or flighted wheel 145) are to be actuated, may be sent individually or they may be grouped together by queue generation system 278 and sent, as groups, to valve control signal generator 258. Sending them individually or queuing the actuation events and sending them to valve/commodity meter control signal generator 258, in groups, is indicated by block 350 in the flow diagram of FIG. 13. Valve/meter actuation identification system 256 can identify when the valves/meters are to be actuated and output an indication of that to valve/commodity meter control signal generator 258, in other ways as well. This is indicated by block 352 in the flow diagram of FIG. 13.

Valve/commodity meter control signal generator 258 then generates control signals to control valve/meter actuation, based upon the output from valve/meter actuation identification system 256. The control signals control valves 109 and/or commodity motor 88 (and thus metering system 86—e.g., flight wheel 145) so that the material being applied is applied at the desired location in the furrow, e.g., relative to the seed location. Generating control signals to control valve actuation is indicated by block 354 in the flow diagram of FIG. 13.

In one example, there is a single valve and/or that controls a single nozzle and/or a single flighted wheel 145, per row being planted. Controlling a single valve/commodity meter 86 is indicated by block 356. In another example, it may be that the commodity meter 86 and/or the nozzles or valves do not have a high enough bandwidth, e.g., max operating frequency, in order to apply the material at the desired frequency. In that case, there may be multiple valves/commodity meters per row being planted that can be controlled in order to achieve a higher application rate. These same types of configurations can be used when actuators 109 are pumps instead of valves.

For example, the seed population (e.g., seeds/acre) and row spacing are used to determine the seed-to-seed spacing in the furrow 162. This spacing, and the travel speed of planter 100, can be used to identify how quickly a valve is to respond in order to administer per-seed application (e.g., on each seed or between adjacent seeds/grains). A target seed rate of, for instance, 36,000 seeds/acre, with the planter traveling at 10 mph and with a thirty-inch row spacing, means that a nozzle on the planter will pass thirty seeds per second, or one seed every thirty three milliseconds. Some current fertilizer valves operate at about 10-15 Hz. Additionally, the opening time and closing time for some current valves can be approximately 7-8 milliseconds. This is often not fast enough to place fertilizer (or other material) on a per seed basis. Thus, the present system can have two or more valves (e.g., solenoids or other valves) per row operating out of phase (e.g., evenly out of phase) with one another to increase the overall frequency with which material can be applied in a row. While one valve is closing, another can be opening. Each valve can have its own nozzle or multiple valves can share a nozzle or multiple valves can provide material to multiple nozzles. These multiple valves per row can be placed proximate one another in the valve locations identified above in FIGS. 2-5 or elsewhere. They can be controlled using control signals timed as described herein for a single valve, except that the valve control signals can be spread across the multiple valves to obtain the desired material application rate, timing and placement. While this example discusses valves, the same can be said of commodity meter 86 or flighted wheels 145 (or other commodity meters 86). There may be a plurality of independently controllable flighted wheels 145 per row unit. They can be controlled to increase the application bandwidth.

Further, it may be desirable to apply multiple different materials per row. In that case, there may be multiple different valves, per row, each dispensing a different material. Thus, valve/meter actuation identification system 256 can provide an indication as to when to actuate each of the valves/meters to apply the corresponding material, so that it is applied at the desired location relative to the seed, and valve/meter control signal generator 258 generates control signals for the different valves, and/or meters based upon the output from system 256. For example, one valve or valve set may apply a first commodity directly to the seed while another valve or valve set may apply a second commodity, e.g., a hot commodity, between seeds. The same control can be performed with multiple flighted wheels dispensing material from different tasks or different compartments within a tank. Controlling multiple valves/meters per row is indicated by block 358. Valve/meter control signal generator 258 can generate control signals to control the valves/meters in a wide variety of other ways as well, and this is indicated by block 360.

This continues until the planting operation is complete. This is indicated by block 362 in the flow diagram of FIG. 13.

Figure 14:
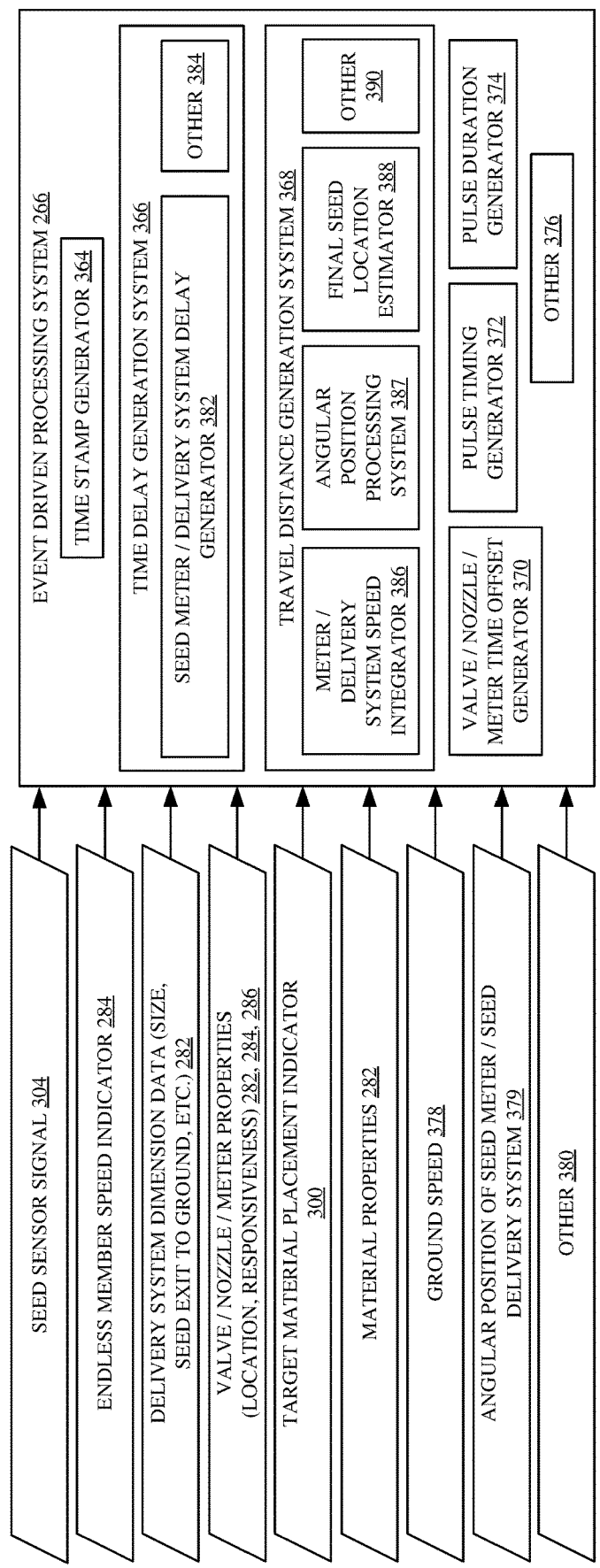
FIG. 14 is a block diagram showing one example of an event driven processing system.

FIG. 14 is a block diagram showing one example of event driven processing system 266, in more detail. System 266 illustratively includes time stamp generator 364, time delay generation system 366, travel distance generation system 368, valve/nozzle/meter time offset generator 370, pulse timing generator 372, pulse duration generator 374, and it can include a wide variety of other items 376. FIG. 14 also shows that, in one example, event driven processing system 266 receives the one or more seed sensor signals 304, a seed endless member speed indicator 284 that indicates the speed of the delivery system 166 and/or meter 124, delivery system and meter dimension data 282 that indicates such things as the meter and/or delivery system size, the distance that the seed will drop after it exits the delivery system to the furrow, etc. System 266 receives valve/nozzle/meter properties (such as valve and commodity meter location and responsiveness). This corresponds to the information 282, 284, and 286 discussed above. It can receive target material placement indicator 300, that identifies where the material is to be applied, e.g., relative to the seed in the furrow. It can receive the material properties 282. It can also receive an input indicative of ground speed 378. This can come from ground speed sensor 306 (discussed with respect to FIG. 12) or elsewhere. System 266 can receive an input 379 indicative of the angular position of components of the seed meter 124, seed delivery system 166, and/or the commodity delivery system 98. It can receive a wide variety of other information 380 as well. As discussed above, the inputs to event driven processing system 266 can include information from data store 254 or from various different sensors, or from a combination of those things.

Time stamp generator 364 illustratively receives seed sensor signal 304 and generates a time stamp indicating when signal 304 indicates the presence of a seed. Time delay generation system 366 then generates a time delay indicative of the amount of time it will take the seed to travel from the particular seed sensor that sensed it, to an outlet opening of the seed delivery system 166 or seed tube 120 and to its final seed location in the furrow. For instance, seed meter/delivery system delay generator 382 illustratively calculates the amount of time it will take the seed to travel from wherever it was sensed (seed meter 124, seed delivery system 120 or 166, or elsewhere) to the exit end of the seed delivery system, based upon the type of seed delivery system, the type of meter, etc. Generator 382 can identify the angular position of the sensed element (the seed meter 124 or delivery system 166) and calculate the amount of the time that will be needed to rotate to an angular position where the seed exits the system. Where the seed is sensed in the seed meter, generator 382 obtains the speed (and perhaps the angular position) of the seed meter and the speed (and perhaps angular position) of the delivery system 166, along with the size of both (e.g., the distance the seed must travel at the two different speeds) to identify a time when the seed will exit the seed delivery system. If the seed delivery system 166 is a seed tube 120, then the travel time through the seed tube will correspond, at least partially, to the acceleration of gravity, as the seed passes through the seed tube (other factors may impact the calculation, such as the forward travel speed of the row unit 106 and the coefficient of friction of both the seed and the inner surface(s) of the seed tube, among other things). If the delivery system 166 is an assistive system, then the time will include the delay of that system in moving the seed from the angular position wherever it was sensed, to the angular position of the outlet end of the delivery system. This may be based on the speed of an endless member, the velocity of a pneumatic assistance system, etc. If the seed sensor is located closer proximate the outlet end of the delivery system, then the time calculated by seed meter/delivery system delay generator 382 will be less, because the seed will be detected closer to the exit end of the delivery system. Depending on the response time of the valves 109 and/or commodity delivery system 98, a seed sensor may be located as close as possible to the outlet end of the seed delivery system (or elsewhere, such as on a seed firmer) to minimize, if not eliminate, the time calculated by seed meter/delivery system delay generator 382. System 366 can include other items 384 as well.

In the example where time delay generation system 366 identifies the time delay, then valve/nozzle/meter time offset generator 370 illustratively calculates a time offset corresponding to the responsiveness of the valve and/or commodity metering system (e.g., motor 88, flighted wheel 145 and application assembly 117) being controlled, under the current conditions. For instance, the responsiveness may vary based upon the particular valve or actuator or flighted wheel, based on the properties of the material being applied, based upon the ambient conditions, based on the pump pressure, or based on other things. Valve/nozzle/meter time offset generator 370 generates an output indicative of a time offset that corresponds to a latency in actuation of the valve and/or the commodity delivery system 84.

Pulse timing generator 372 then generates a timing output indicative of a time when the valve and/or commodity motor 88 should be actuated, based upon the time delay generated by seed meter/delivery system delay generator 382 and the offset generated by valve/nozzle time offset generator 370. In short, seed meter/delivery system delay generator 382 calculates the amount of time it will take for the seed to move from where it was sensed to its final seed location in furrow 162, and valve/nozzle/meter time offset generator 370 will calculate how long it will take to begin applying the material, based upon the properties of the valve or actuator, or commodity delivery system once the actuation control signal is applied to the valve, actuator or commodity delivery system 98. Pulse timing generator 372 then generates a time when the actuator control signal should be applied to the valve/actuator/commodity delivery system, based upon the delay time generated by generator 382 and the offset generated by generator 370, and based upon the time stamp generated by time stamp generator 364.

Pulse duration generator 374 generates an output indicative of how long the valve should stay on, e.g., open or how much flighted wheel 145 should be rotated. This can include determining the latency in the valve response between the time that it is commanded to close and when it actually closes and the latency of the motor response between the time motor 88 is commanded to rotate and when it actually rotates. This may vary based upon the type of material being applied, based upon ambient conditions, etc. The two timing signals (the pulse time indicating when the actuator should be actuated, and generated by generator 372, and the pulse duration output by pulse duration generator 374) are provided to valve/meter control signal generator 258. Valve/meter control signal generator 258 generates valve/meter control signals to actuate the valve or motor 88 at the time indicated by pulse timing generator 372, and to keep the valve or motor actuated for a duration indicated by pulse duration generator 374. The rate at which the material is applied can also be varied. For example, the valve may be a proportional valve or motor 88 can be a speed controlled motor so more or less material can be applied within a given time.

In another example, where the seed metering system or seed delivery system changes speeds during planting, instead of using time delay generation system 366 (or in addition to it), event driven processing system 266 can include travel distance generation system 368. Instead of calculating the time that will be needed to move the seed from the location where it was sensed, e.g., in the seed meter or the seed delivery system, into the furrow, seed meter/delivery system speed integrator 386 can integrate acceleration (that arises from changes in velocity) to obtain the velocity of the system and it can then integrate the velocity to obtain a signal indicative of the location of the seed (or the distance it has traveled) to determine when the seed exits the seed delivery system, and final seed location estimator 388 determines where the seed will be in its final seed location in furrow 162.

As an example, seed meter/delivery system speed integrator 386 integrates the acceleration and speed of the seed meter (if the seed sensor is disposed on the seed meter), and/or the acceleration and speed of the seed delivery system 166 (if the seed sensor is disposed on the seed delivery system). This provides a distance indicator that indicates the distance traveled by the seed. This distance is compared to the dimensions of the seed meter and/or seed delivery system 166 to determine when the seed has traveled a sufficient distance that it has reached the exit end of the seed delivery system 166. When this occurs, integrator 386 provides an output indicating that the seed should now be exiting the seed delivery system 166. The same type of distance indicator can be obtained by angular position processing system 387 detecting the change in angular position of the seed meter and seed delivery system over time, since the seed was detected.

Final seed location estimator 388 estimates when the seed has reached its final location based upon the distance it must travel from the exit end of the seed delivery system 166 to the bottom of the furrow 162. It may include factors that accommodate for possible rolling of the seed, or other movement of the seed after it reaches the ground. Final seed location estimator 388 then generates an output indicating that the seed has reached its final location.

Knowing that the seed is in its final location (or when it will be in its final location, or knowing the final location), valve/nozzle/meter time offset generator 370 can generate an output indicating any time offset corresponding to the valve/actuator/meter latency or responsiveness. Pulse timing generator 372 and pulse duration generator 374 generate the timing for the valve/actuator/meter control signal and its duration, as described above.

Figure 15:
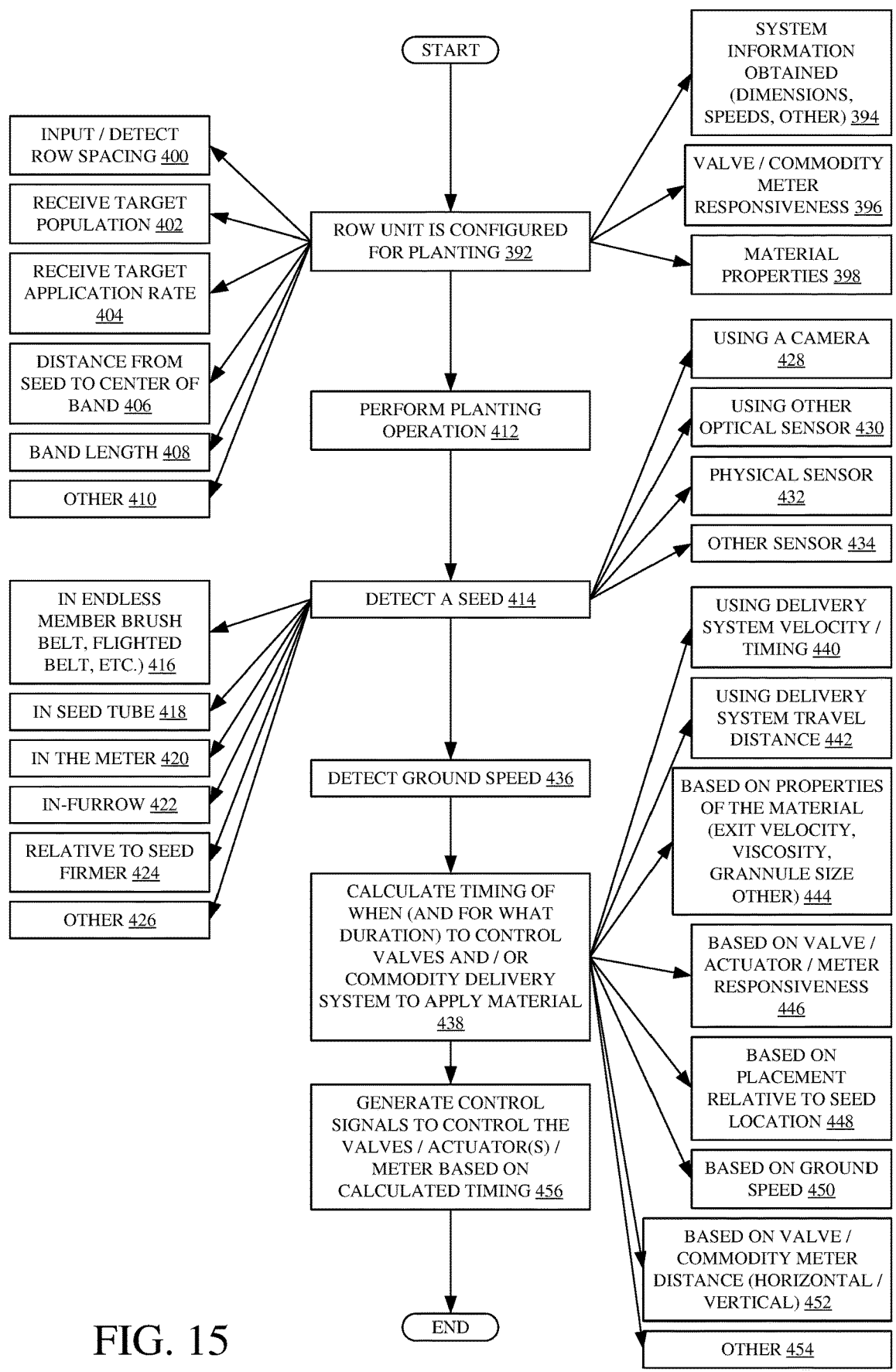
FIG. 15 is a flow diagram showing example of the operation of event driven processing.

FIG. 15 is a flow diagram showing one example of the operation of event driven processing system 266 (discussed with respect to FIG. 14), in more detail. It is first assumed that row unit 106 is configured for planting. This is indicated by block 392 in the flow diagram of FIG. 15. It has thus illustratively sensed or obtained the system information, such as the system dimensions, valve placement, etc. This is indicated by block 394. It has also illustratively obtained or sensed valve/commodity delivery system responsiveness as indicated by block 396 and the properties of the material (e.g., granular, liquid) being applied. This is indicated by block 398. It can receive or detect row spacing as indicated by block 400, target population as indicated by block 402, and target application rate as indicated by block 404. It can detect or receive the application placement. In the present example, it will be assumed that the material is to be applied in a band. In that case, system 266 detects the distance from the seed location to the center of the band (in some examples, the valve/nozzle/commodity meter may be laterally adjustable such that the center of the band may be selectively placed relative to an actual or theoretical seed location). This is indicated by block 406. It can detect or receive the desired band length as indicated by block 408, and a wide variety of other information as indicated by block 410.

At some point, the planting operation begins so that row unit 106 is performing the planting operation. This is indicated by block 412. Because FIG. 15 is discussing the operation of event driven processing system 266, that means that controlling the application of the material is based on an event, such as a seed detection. Therefore, system 266 receives the seed sensor signal 304 indicating that a seed has been detected. This is indicated by block 414 in the flow diagram of FIG. 15. The seed can be detected by a sensor 203 that is on the seed delivery system 166 (such as on the brush belt or flighted belt) as indicated by block 416. The seed sensor can be sensor 122 on the seed tube 120 as indicated by block 418. It can be sensor 193 on the seed meter as indicated by block 420, or it can be arranged so that it detects the seed after it is at its final seed location in the furrow, as indicated by block 422. It can be placed on or near a seed firmer as indicated by block 424, or it can be placed in a wide variety of other locations, as indicated by block 426. The seed can be detected using a camera, as indicated by block 428. It can be detected using another type of optical sensor, such as the sensors discussed above, as indicated by block 430. It can be detected using a physical sensor (such as a deflectable finger sensor that deflects when the seed travels past it, as indicated by block 432. It can be detected using RADAR or LIDAR or a wide variety of other types of sensors as well, and this is indicated by block 434.

Event driven processing system 266 also illustratively detects (or is provided) the ground speed 378. This is indicated by block 436 in the flow diagram of FIG. 15.

Event driven processing system 266 then calculates the timing of when to control the valves 109 and/or commodity delivery system 98 to apply the material. This is indicated by block 438 in the flow diagram of FIG. 15. It can do this using the delivery system velocity or timing, such as by using timing delay generation system 366. Calculating the timing for controlling the valves and/or commodity delivery system 98 in this way is indicated by block 440 in the flow diagram of FIG. 15. It can also do it by using the delivery system travel distance, such as by using travel distance generation system 368. This is indicated by block 442 in the flow diagram of FIG. 15. Calculating the control signal timing using the time delay generation system 366 is discussed in greater detail elsewhere herein, including with respect to FIG. 16. Calculating the control signal timing using travel distance generation system 368 is discussed in greater detail elsewhere herein, including with respect to FIG. 17.

The timing of the valve/meter actuation control signals can be calculated based upon the properties of the material being applied (such as the desired exit velocity, viscosity, granule size, etc.). This is indicated by block 444. The timing can be calculated based on the valve/actuator/meter responsiveness as indicated by block 446. The timing can be based upon the desired material placement relative to the final seed location. This is indicated by block 448. It can be calculated based upon the ground speed of row unit 106, as indicated by block 450. It can be calculated based on the valve/commodity meter location (such as the horizontal or vertical location of the valve 109 and/or flighted wheel 145 on row unit 106). This is indicated by block 452 in the flow diagram of FIG. 15.

At block 452, for instance, the valve may have a camera located on it so that the seed can be sensed in close proximity to the valve. The camera may be on a seed firmer so that it detects the final location of the seed in the furrow. In any of these cases, the valve/commodity meter location on row unit 106 is known, at least relative to other items so that it can be actuated at the appropriate or desired time.

The timing can be calculated in a wide variety of other ways as well, and based on a wide variety of other criteria. This is indicated by block 454.

Once the timing is calculated (of when and for what duration to control the valves/commodity meter to apply the material), at block 438, this is provided to valve/meter control signal generator 258 (shown in FIG. 12), which generates valve/meter control signals to control the valves/actuators/commodity meter based upon the calculated timing. This is indicated by block 456 in the flow diagram of FIG. 15.

Figure 16:
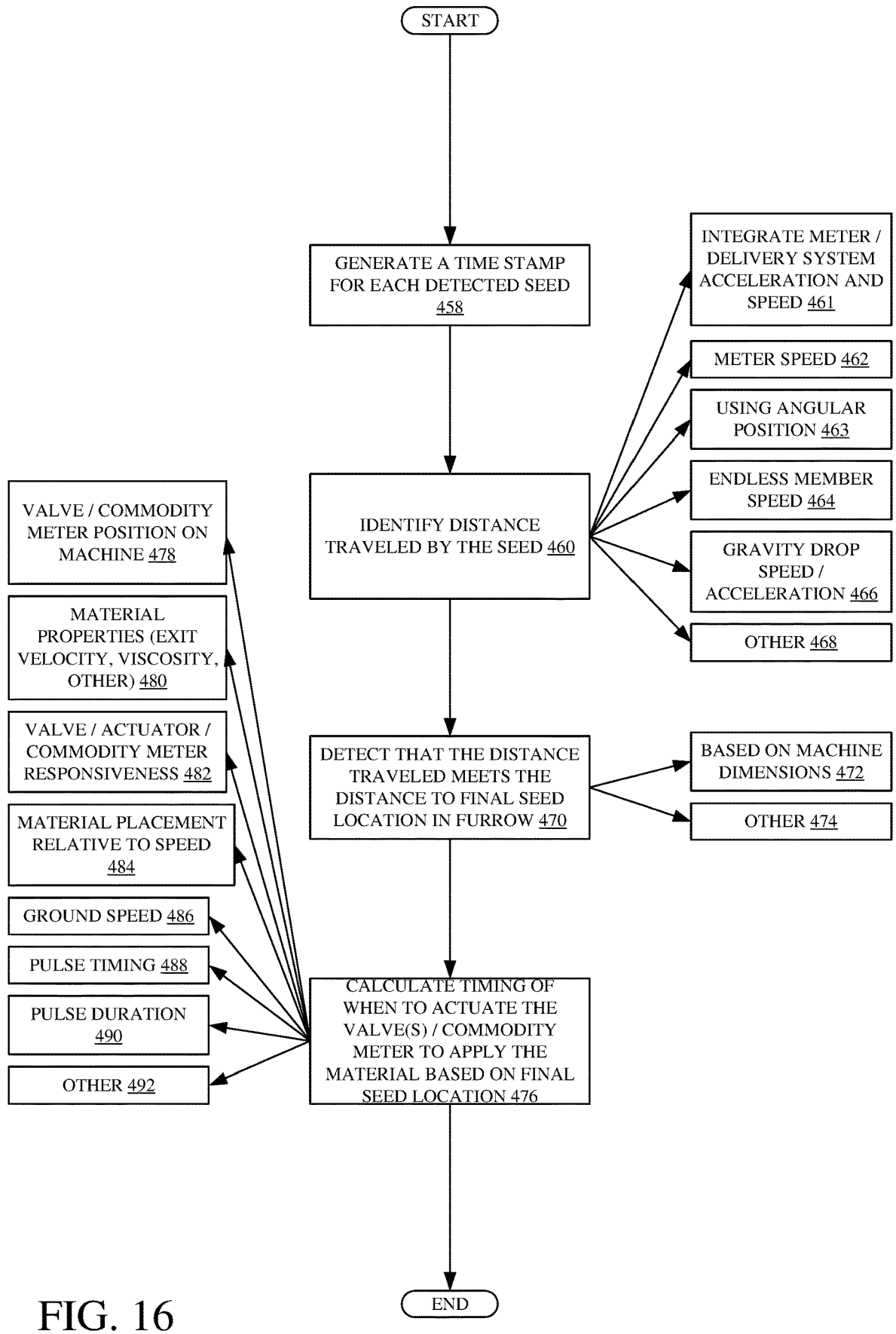
FIG. 16 is a flow diagram showing one example of the operation of a travel distance generation system.

FIG. 16 is a flow diagram illustrating one example of the operation of event driven processing system 266, where it uses travel distance generation system 368 to calculate the timing for valve/commodity meter actuation. Thus, in the example described with respect to FIG. 16, time stamp generator 364 receives seed sensor signal 304 and generates a time stamp when signal 304 indicates that a seed has been detected. This is indicated by block 458 in the flow diagram of FIG. 16.

Travel distance generation system 386 then generates an indication of how far the seed needs to travel to be placed in the furrow. This is indicated by block 406. Meter/delivery system speed integrator 386 can integrate the seed meter and/or seed delivery system acceleration and speed (depending upon where the seed was sensed) to identify a distance that the seed has traveled, since it was sensed. This is indicated by block 460. For instance, where the seed is sensed in meter 124, it will integrate over the meter acceleration and speed. Where it is sensed in the endless member (or delivery system 166) it will integrate the endless member acceleration and speed. It will be noted that if the seed is detected in the meter, the integration will be performed both over the meter acceleration and speed (until the seed exits meter 124 into delivery system 166) and then over the endless member or delivery system acceleration and speed. Where the delivery system is a seed tube, then it will be integrated (or double integrated) over the gravity drop speed or acceleration of the seed (of course, other factors may be taken into account, such as friction and forward travel speed of the row unit). The integration can be performed in other ways as well. Integrating meter/delivery system speed and acceleration is indicated by block 461.

For instance, once the seed exits the seed delivery system 166, the integration may also be performed over the speed or acceleration of the seed, as it drops into furrow 162. This will account for the change in seed position after it leaves the delivery system. In a scenario where the seed is ejected from delivery system 166 with a velocity that is equal in magnitude but opposite in direction relative to the forward travel direction of row unit 106, then it will fall substantially only under the influence of gravity, after it leaves delivery system 166.

The distance that the seed travels can also be done by angular position processing system 387 using the angular position data 379 when the seed was sensed, the angular distance the seed needs to travel to the exit point, and the speed and/or acceleration of the seed meter and/or seed delivery system. Using angular position is indicated by block 463. If the seed is sensed in the seed meter 124, then the angular distance traveled in the seed meter, and seed meter speed/acceleration will be considered along with that of the seed delivery system. Considering seed meter speed/acceleration is indicated by block 462. Considering speed/acceleration of the endless member is indicated by block 464. Considering gravity drop system is indicated by block 466. Distance of seed travel can be calculated in other ways as well. This is indicated by block 468.

Final seed location estimator 388 then detects when the distance traveled meets the distance from where the seed was sensed, to the final seed location in the furrow 162. This is indicated by block 470. This can be based upon the machine dimensions (such as the size of the meter, delivery system, etc.). This is indicated by block 472. It can be based on other items as well, and this is indicated by block 474.

Event driven processing system 266 then (or simultaneously with or before the processing described above) calculates the timing of when to actuate the valves/commodity meter to apply the material based upon the final seed location. This is indicated by block 476 in the flow diagram of FIG. 16. Valve/nozzle/meter time offset generator 370 illustratively generates a time offset that corresponds to the location of the valve/commodity meter on row unit 106. For instance, if it is located well behind the seed delivery system, then the time delay may be longer. If it is located closely proximate the seed delivery system, then the time delay may be shorter. Calculating a time delay based on valve/meter position is indicated by block 478 in the flow diagram of FIG. 16.

Valve/nozzle/meter time offset generator 370 can also illustratively generate an offset value based upon the properties of the material being applied (such as its exit velocity, viscosity, granule size, etc.). This is indicated by block 480. It can generate a time delay based upon the valve or actuator or commodity meter responsiveness, as indicated by block 482, and it can generate a delay or offset based upon the desired placement of the material relative to the final seed location. This is indicated by block 484. It can generate these time offsets based upon the ground speed of row unit 106 as well. This is indicated by block 486.

Based upon the timing, and the time stamp corresponding to the seed, pulse timing generator 372 generates a timing output indicating when the valve 109 or meter 86 should be actuated. This is indicated by block 488. Pulse duration generator 374 provides an output indicating how long the valve/meter should be actuated. This is indicated by block 490. The timing of when to actuate the valves/meters to apply the material based on the final seed location can be done in a wide variety of other ways as well, and this is indicated by block 492 in the flow diagram of FIG. 16.

Figure 17:
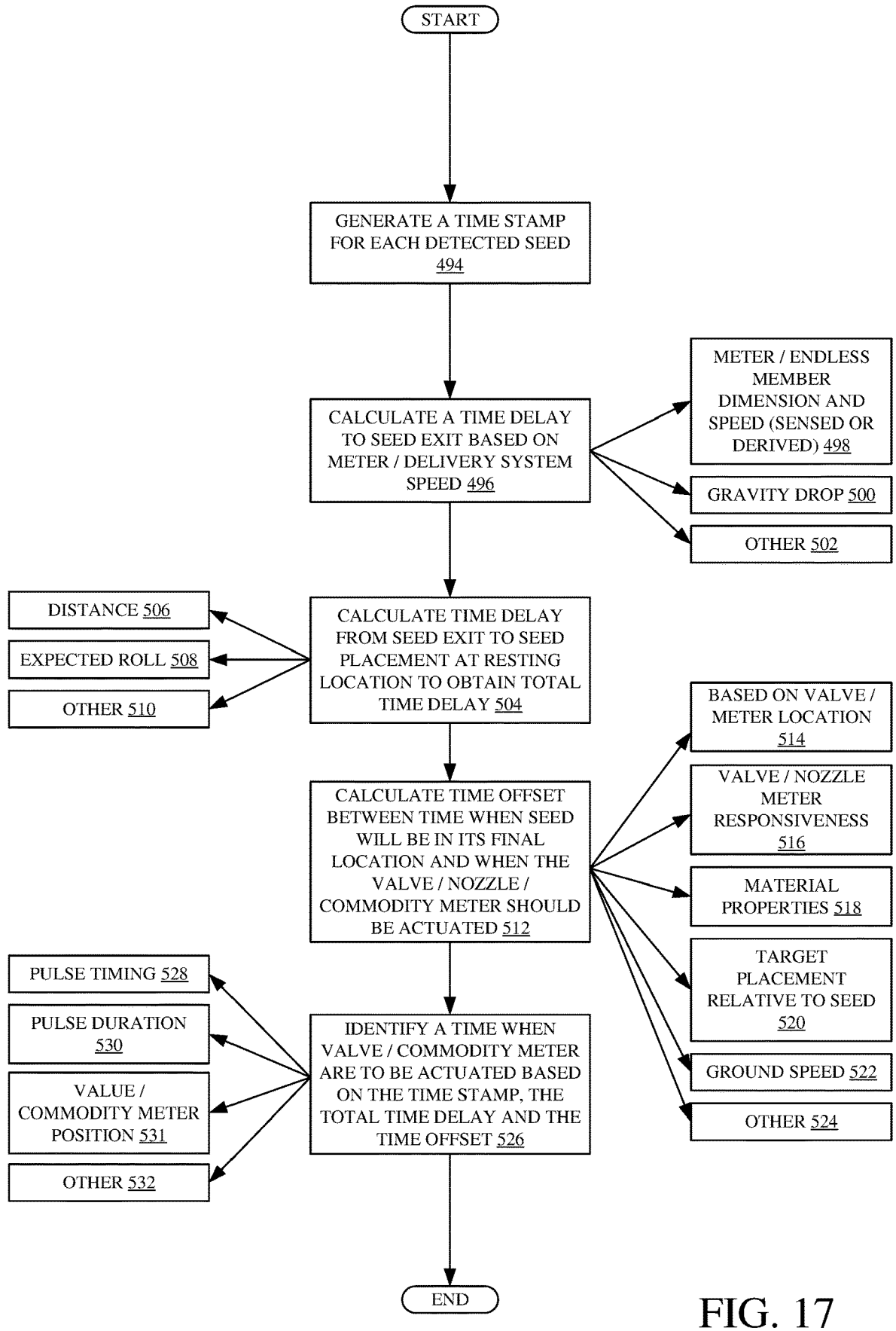
FIG. 17 is a flow diagram showing one example of the operation of a time delay generation system.

FIG. 17 is a flow diagram showing one example of the operation of event driven processing system 266 in an implementation in which it uses time delay generation system 366. It is first assumed that time stamp generator 364 receives an input from seed sensor signal 304 indicating that a seed has been detected. It generates a time stamp for that event, as indicated by block 494 in the flow diagram of FIG. 17. Time delay generation system 366 then generates a time delay incurred by the seed as it moves through to the seed meter or seed delivery system (depending upon where the seed was sensed) so that the valve/meter actuation signals can be generated to actuate the valves and/or commodity meter to place the material at the desired location, relative to the final seed location. Calculating a time delay to the seed exit from the delivery system 166, based on the seed meter/delivery system speed is indicated by block 496 in the flow diagram of FIG. 17. Seed meter/delivery system delay generator 382 can calculate the time delay based upon the speed of the meter and the delivery system (where the seed was detected in the meter) and/or based upon just the speed of the delivery system (where the seed was detected in the delivery system). This is indicated by block 498. When the delivery system is a seed tube, the time delay for the delivery system can be calculated based upon how long it will take the seed to drop from the seed sensor to the ground, under the force of gravity (considering things such as friction with the seed tube, forward velocity of the row unit, etc.). This is indicated by block 500. The time delay for the seed meter/delivery system can be calculated in other ways as well, and this is indicated by block 502.

Time delay generation system 366 also calculates the time delay that will be incurred by the seed as it moves from the exit of the seed delivery system 166 to its final location in the furrow 162. This delay, along with the delay attributable to the seed meter/delivery system, will be the total time delay. This is indicated by block 504 in the flow diagram of FIG. 17. The time delay incurred from the exit of the delivery system 166 to the final seed location can be based upon that distance, as indicated by block 506. It can also be based on an expected seed roll, where the seed is expected to roll before it settles to its final location. This is indicated by block 508. The time delay can be calculated in other ways as well, such as based on the velocity at which the seed is ejected from the delivery system 166, and this is indicated by block 510.

Valve/nozzle/meter time offset generator 370 then calculates a time offset between the time when the seed will be in its final location and when the valve/nozzle 109 and/or the commodity delivery system 98 should be actuated. This is indicated by block 512 in the flow diagram of FIG. 17. This can be based upon the valve/commodity meter location on row unit 106, as indicated by block 514. It can be based upon the valve/nozzle/meter responsiveness as indicated by block 516 and based on the material properties of the material being applied, as indicated by block 518. It can be based upon the target placement of the material relative to the final seed location, as indicated by block 520. It can be based on the ground speed of row unit 106, as indicated by block 522, and it can be based on a wide variety of other information as well, as indicated by block 524.

Pulse timing generator 372 and pulse duration generator 374 then identify a time when the valve and/or commodity meter is to be actuated, based upon the total time delay and the time offset discussed above. This is indicated by block 526. For instance, pulse timing generator 372 generates an output indicative of when the valve/actuator/commodity meter control signal is to be applied to the valve to open it and/or to the commodity meter to rotate it, based upon the time stamp, the total time delay, and the time offset, as discussed above. This is indicated by block 528. Pulse duration generator 374 generates an output indicative of how long the valve should be on/open and/or how long the commodity meter should rotate. This is indicated by block 530. If the application rate is to vary over the pulse duration, then the valve position and/or commodity meter speed can be controlled as well, as indicated by block 531. The time when the valve/meter should be actuated, and the duration and position, can be identified in other ways as well, and this is indicated by block 532.

Figure 18:
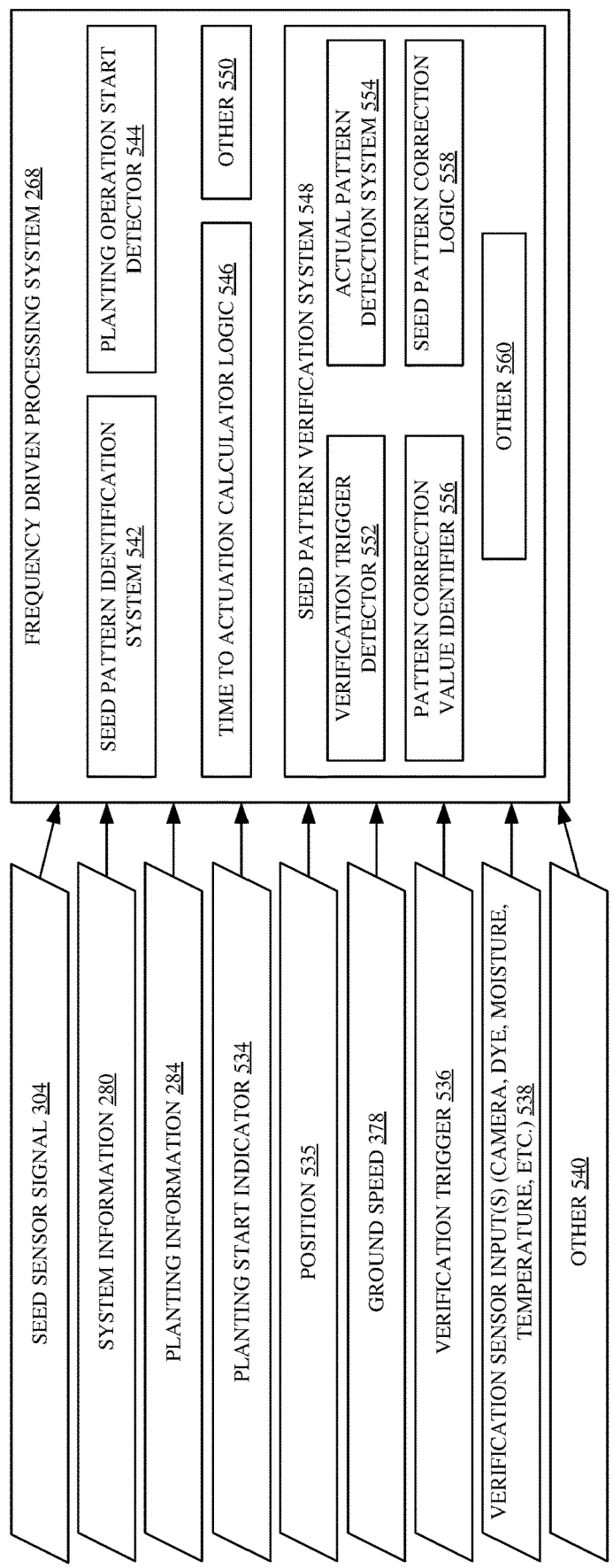
FIG. 18 is a block diagram showing one example of a frequency driven processing system.

FIG. 18 is a block diagram showing one example of the frequency driven processing system 268 (briefly discussed above with respect to FIG. 12) in more detail. The present discussion proceeds with respect to generating an a priori seed pattern and then applying material based on that pattern. However, the opposite can be done as well. The material can be applied first, to obtain an a priori material pattern. The seeds can then be planted, relative to the material, based on the a priori material pattern. For instance, where the material is fertilizer, the fertilizer can be applied first, and the seeds can be planted later, based on the pattern used to apply the fertilizer. Also, while the present discussion proceeds with respect to generating the a priori seed pattern, it could instead be a plant pattern where the material is applied relative to the location of plant, instead of seeds.

FIG. 18 shows that system 268 can illustratively receive a variety of inputs, some of which are the same as those discussed above, and are similarly numbered. System 268 also illustratively receives a planting start indicator 534 that can be generated from planting start signal generator 316. Some examples of this are discussed elsewhere herein. It can receive a verification trigger 536 generated from verification trigger generator 318. It can also receive verification sensor inputs 538 that are generated by verification sensors 320. It can receive a wide variety of other information 540 as well.

In the example shown in FIG. 18, frequency driven processing system 268 illustratively includes seed pattern identification system 542, planting operation start detector 544, time to actuation calculator logic 546, seed pattern verification system 548, and it can include other items 550. Seed pattern verification system 548, itself, illustratively includes verification trigger detector 552, actual pattern detection system 554, pattern correction value identifier 556, seed pattern correction logic 558, and it can include other items 560.

Seed pattern identification system 542 generates an a priori seed pattern that identifies, once the seeding operation begins, where seeds will eventually be placed. Planting operation start detector 544 detects when the planting operation begins based on the planting start indicator 534, and time to actuation calculator logic 546 calculates timing for when the valves 109 and/or commodity meter 86 should be actuated to apply the material, based upon the seed locations in the a priori seed pattern, based upon the current position of row unit 106, and based upon its ground speed. Thus, frequency driven processing system 268 can apply the material before the seeds are placed in furrow 162, or after they are placed there, or simultaneously with seed placement. This is because the a priori seed pattern identifies how often seeds will be planted, once row unit 106 begins the operation. This, along with the system information that defines where the valve and/or commodity meter 86 are on the row unit 106 relative to the different parts of the row unit 106, and the ground speed information indicating how quickly the row unit 106 is traveling, can be used to actuate the valves and/or the commodity meter in order to apply the material at desired locations, relative to the seed positions.

It may be, however, that the a priori seed pattern is slightly inaccurate, or becomes less accurate over time. Thus, seed pattern verification system 548 can be used to verify and correct the a priori seed pattern. Verification trigger detector 552 detects when a verification trigger is present, indicating that a verification operation should be performed. The a priori seed pattern can be verified at certain time intervals, at intervals of distance traveled by row unit 106, at intervals of a number of seeds that have been planted (or should have been planted), at intervals corresponding to material application rate, or the trigger can be a wide variety of other items.

Again, while the present description proceeds with respect to correcting the a priori seed pattern, this is just one example. When an a priori fertilizer pattern is generated, it can be corrected based on a verification input verifying that the pattern is correct, such as a moisture sensor input that senses increased moisture due to liquid fertilizer, a dye sensor (such as an optical or other sensor), that senses a color of fluid or granular material, a temperature sensor, etc. These sensor inputs indicate the actual presence of the material and can thus be used to correct the a priori fertilizer pattern.

Once triggered, actual pattern detection system 554 detects the actual seed pattern. For instance, system 554 can be event driven processing system 266 that detects the actual seed pattern based upon an actual event, such as a seed detection. The actual pattern can be detected in a wide variety of other ways as well, and using the event driven approach discussed above is only one example.

Pattern correction value identifier 556 can compare the actual seed pattern to the a priori seed pattern that is being used by frequency driven processing system 268 in order to apply the material. It can identify an error value that indicates how the a priori seed pattern may be inaccurate, based upon the actual seed pattern. For instance, for a wide variety of different reasons, it may be that the a priori seed pattern has shifted timing of the material application so it is a distance, e.g., several inches, from where it is actually desired. Detecting the actual seed pattern and calculating a correction value can be performed by pattern correction value identifier 556.

The correction value is illustratively provided to seed pattern correction logic 558, which performs a correction on the a priori seed pattern to generate a corrected a priori seed pattern. The corrected a priori seed pattern can then be used by frequency driven processing system 268 in applying the material, in the future. It will be noted that the verification process can be repeated and the corrected a priori seed pattern can, itself, be corrected should it become inaccurate.

Figure 19A:
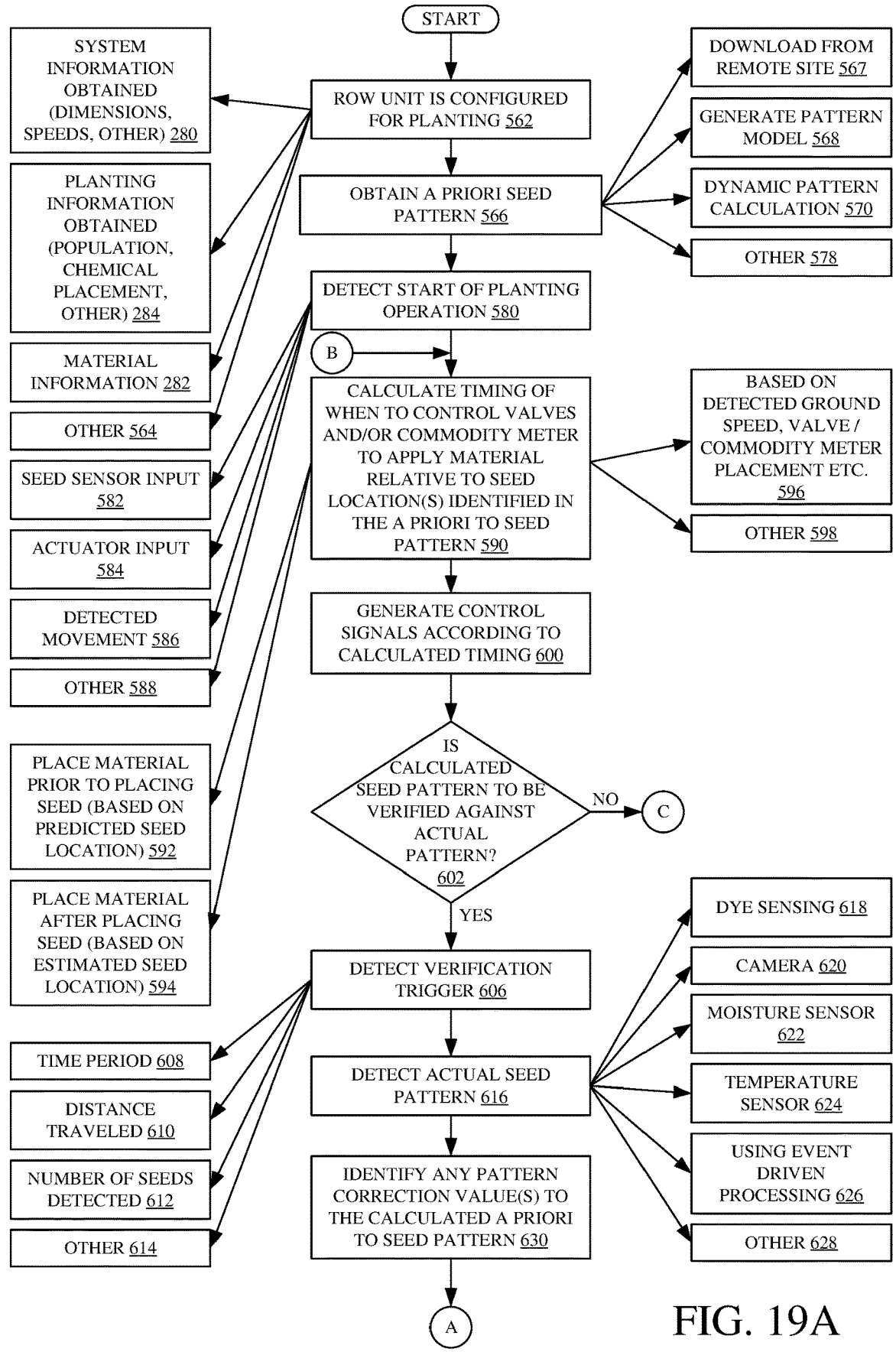
FIGS. 19A and 19B (collectively referred to herein as FIG. 19) show a flow diagram illustrating one example of the operation of the frequency driven processing system illustrated in FIG. 18.
Figure 19B:
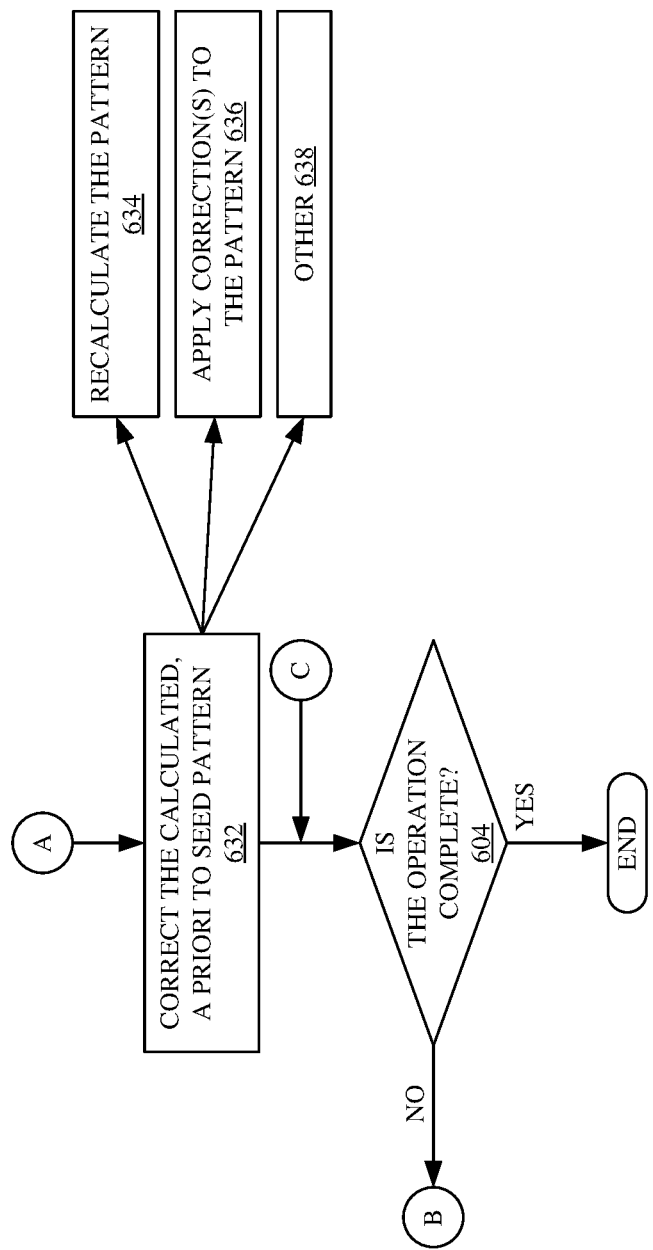

FIGS. 19A and 19B (collectively referred to herein as FIG. 19) show a flow diagram illustrating one example of the operation of frequency driven processing system 268 in more detail. It is first assumed that row unit 106 is configured for planting. This is indicated by block 562 in the flow diagram of FIG. 19. It will illustratively have obtained or be configured to sense, system information 280. It will also be configured to obtain or sense planting information 284, material information 282, and it can be configured in a wide variety of other ways as well, as indicated 564.

An a priori seed pattern is then obtained. This is indicated by block 566. It can be downloaded from a remote site (in an example in which it was previously generated and stored). This is indicated by block 567. Seed pattern identification system 542 can calculate an a priori seed pattern. This can be done using a pattern model where inputs include values for the different systems, planting and material variables, along with a priori information, and other information. When that information is applied to the model, the model may generate a seed pattern that can be used by frequency driven processing system 268. Generating the pattern using a pattern model is indicated by block 568. Seed pattern identification system 542 can generate the seed pattern dynamically using a dynamic pattern calculation mechanism that considers the variable values. This is indicated by block 570. The seed pattern can be calculated in other ways as well, and this is indicated by block 578.

The a priori seed pattern will identify such things as seed placement timing, the offsets between when a seed is placed and when the various actuator signals should be applied to valves 109, and/or seed meter 86 among other things. Thus, once the planting operation has started, the a priori seed pattern can be used to generate actuator control signals to control the actuators to apply the material where desired, relative to the seed positions, based on the timing indicated in the a priori seed pattern.

At some point, the planting operation will begin, and this can be detected by planting operation start detector 544. Detecting the start of the planting operation is indicated by block 580. This can be done in a wide variety of different ways. For instance, a seed sensor can generate a signal indicating the presence of a seed in the delivery system. This may indicate that the planting operation has begun. This is indicated by block 582. It may be that operator 92 actuates an operator input mechanism in the operating compartment of the towing vehicle to start the planting operation. This actuation may be detected as indicated by block 584. It may be that movement of row unit 106, or the delivery system or seed meter may be detected as the beginning of the planting operation. This is indicated by block 586. The start of the planting operation can be detected in a wide variety of other ways as well, and this is indicated by block 588.

Time to actuation calculator logic 546 then calculates the time when the valves 109 and/or commodity meter 86 are to be controlled to apply the material, relative to the seed placement timing identified in the a priori seed pattern. This is indicated by block 590 in the flow diagram of FIG. 19. It may be that the material is to be placed before the seed is planted. This can be done because the timing for the seed to arrive at its final location is already known, in the a priori seed pattern. Placing the material prior to placing the seed is indicated by block 592. The material may be placed after the seed is placed, again based upon the estimated seed placement timing in the a priori seed pattern. This is indicated by block 594. The timing can be generated based upon the detected ground speed, valve/commodity meter placement and/or any of the other system information, material information, planting information or sensor value inputs. This is indicated by block 596. The timing can be calculated in a wide variety of other ways as well, and this is indicated by block 598.

The timing is then provided to valve control signal generator 258 (shown in FIG. 8), which generates the valve/commodity meter control signals and applies them to valves 109 and/or commodity meter motor 88 according to the calculated timing. This is indicated by block 600 in the flow diagram of FIG. 19.

In some implementations, it may be that the a priori seed pattern is to occasionally be verified and/or corrected. This is indicated by block 602. If not, processing proceeds at block 604 where the operation continues until the planting operation is complete.

However, if, at block 602, it is determined that the a priori seed pattern is to be verified and/or corrected, then at some point verification trigger detector 552 detects a verification trigger indicating that a verification and/or correction operation is to be performed. This is indicated by block 606 in the flow diagram of FIG. 19. The trigger can be a time-based trigger, as indicated by block 608. It can be distance-based trigger as indicated by block 610. It can be a number of seeds-based trigger as indicated by block 612, or the trigger can be any of a wide variety of other triggers, as indicated by block 614.

Actual pattern detection system 554 illustratively detects the actual seed pattern to identify whether the material is being applied, as desired. If the actual seed pattern is shifted from the a priori seed pattern, or is different in another way, then it is likely that the material is not being applied, as desired. Detecting the actual seed pattern is indicated by block 616 in the flow diagram of FIG. 19.

There are a wide variety of different ways to detect whether the material is being applied, as desired. These can be the same as how the material is sensed in a scenario in which an a priori fertilizer pattern is generated instead of an a priori seed pattern. For instance, it may be that the material has dye added to it and the dye can be easily sensed by an optical sensor, such as a camera, which may also be equipped to detect the seed as well. In that case, actual pattern detection system 554 can detect whether the dyed material is being applied at the desired placement, relative to the seed location. In another example, a camera can be used, in conjunction with a position detector, to detect actual seed location. Detecting the actual seed location using dye sensing is indicated by block 618 and detecting it with a camera is indicated by block 620.

In another example, the material being applied can be sensed in different ways. Where it is a liquid material, a moisture sensor can be used to detect where the material is applied. The moisture sensor may indicate an elevated moisture level in areas where the liquid material has just been applied, over the areas where it has not been applied. Detecting the actual pattern using a moisture sensor is indicated by block 622.

The actual pattern can also be detected using a temperature sensor. For instance, where the material being applied is warmer or cooler than the ground, a temperature sensor can be used to sense that temperature difference to provide an indication of where the material is being applied. Sensing the pattern using a temperature sensor is indicated by block 624.

As discussed herein, the event driven processing system 266, which senses the seed position based upon an actual event (such as an output from the seed sensor) can also be used to detect or verify the a priori seed pattern. This is indicated by block 626. The actual seed pattern can be detected in a wide variety of other ways as well, and this is indicated by block 628.

Based upon the actual pattern detected by system 554, pattern correction value identifier 556 identifies any pattern correction values to the a priori seed pattern. This is indicated by block 630. By way of example, the correction values may be distance values which indicate a difference in geographic position, or relative position, of the seed location in the a priori seed pattern versus the actual seed location. The correction values may be timing values, which correct the timing of the valve/actuator/meter control signals. For instance, it may be that the a priori pattern has the valve/actuator/meter signals being triggered too frequently, or not frequently enough. Thus, the correction values may be timing values.

Once the correction values are identified, seed pattern correction logic 558 illustratively corrects the calculated, a priori seed pattern, based upon the correction values. This is indicated by block 632. In doing so, it can recalculate the entire a priori seed pattern using the correction values. This is indicated by block 634. It can simply apply the correction values to the already calculated a priori seed pattern. This is indicated by block 636. It can correct the a priori seed pattern in other ways as well, and this is indicated by block 638.

Until the planting operation is complete, operation reverts to block 590 where the system continues to identify the timing for generating the valve/actuator/meter control signals to actuate the valve/actuators 109 and/or motor 88 that drives commodity meter 86 using the a priori seed pattern or corrected pattern. This is indicated by block 604.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Further, as discussed elsewhere herein, the present discussion has proceeded primarily with respect to fertilizer or other material application being controlled based on a priori seed location or seed pattern. However, this is just one example. In another example, seed location can be controlled based on a priori fertilizer (or other material) location or pattern. Similarly, instead an a priori or seed location, an a priori plant location can be used as well.

Figure 20:
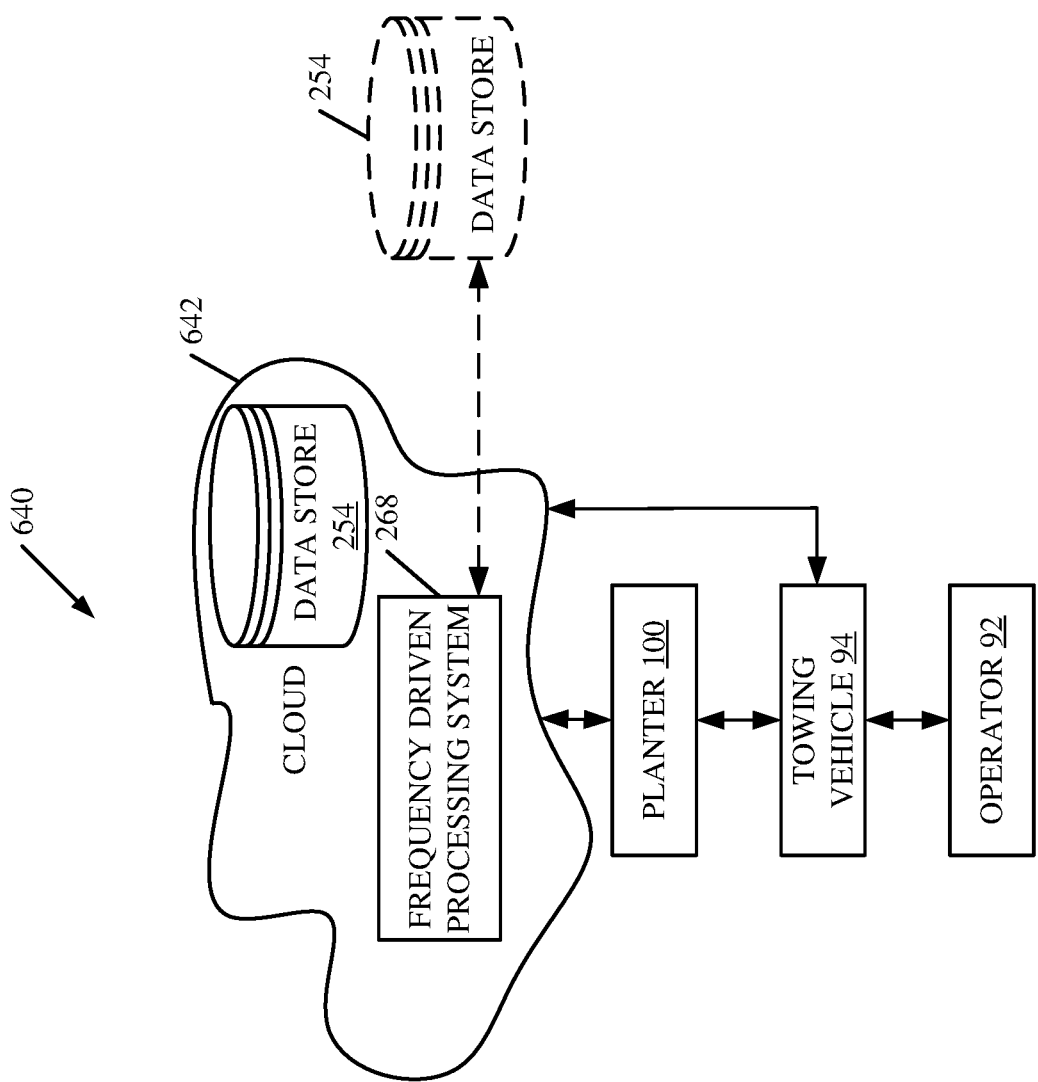
FIG. 20 shows one example of the architecture illustrated in FIG. 1, deployed in a remote server environment.

FIG. 20 is a block diagram of the architecture, shown in FIG. 1, except that it communicates with elements in a remote server architecture 6404. In an example, remote server architecture 640 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 12 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 20, some items are similar to those shown in FIGS. 1 and 12 and they are similarly numbered. FIG. 20 specifically shows that frequency driven processing system 268 and data store 254 can be located at a remote server location 642. Therefore, system 113 accesses those systems through remote server location 642.

FIG. 20 also depicts another example of a remote server architecture. FIG. 20 shows that it is also contemplated that some elements of FIGS. 1 and 12 can be disposed at remote server location 642 while others are not. By way of example, data store 254 can be disposed at a location separate from location 642, and accessed through the remote server at location 642. Regardless of where they are located, they can be accessed directly by system 113, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the planter comes close to the fuel truck for fueling, the system automatically collects the information from the planter using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the planter until the planter enters a covered location. The planter, itself, can then send the information to the main network.

It will also be noted that the elements of FIGS. 1 and 12, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 21:
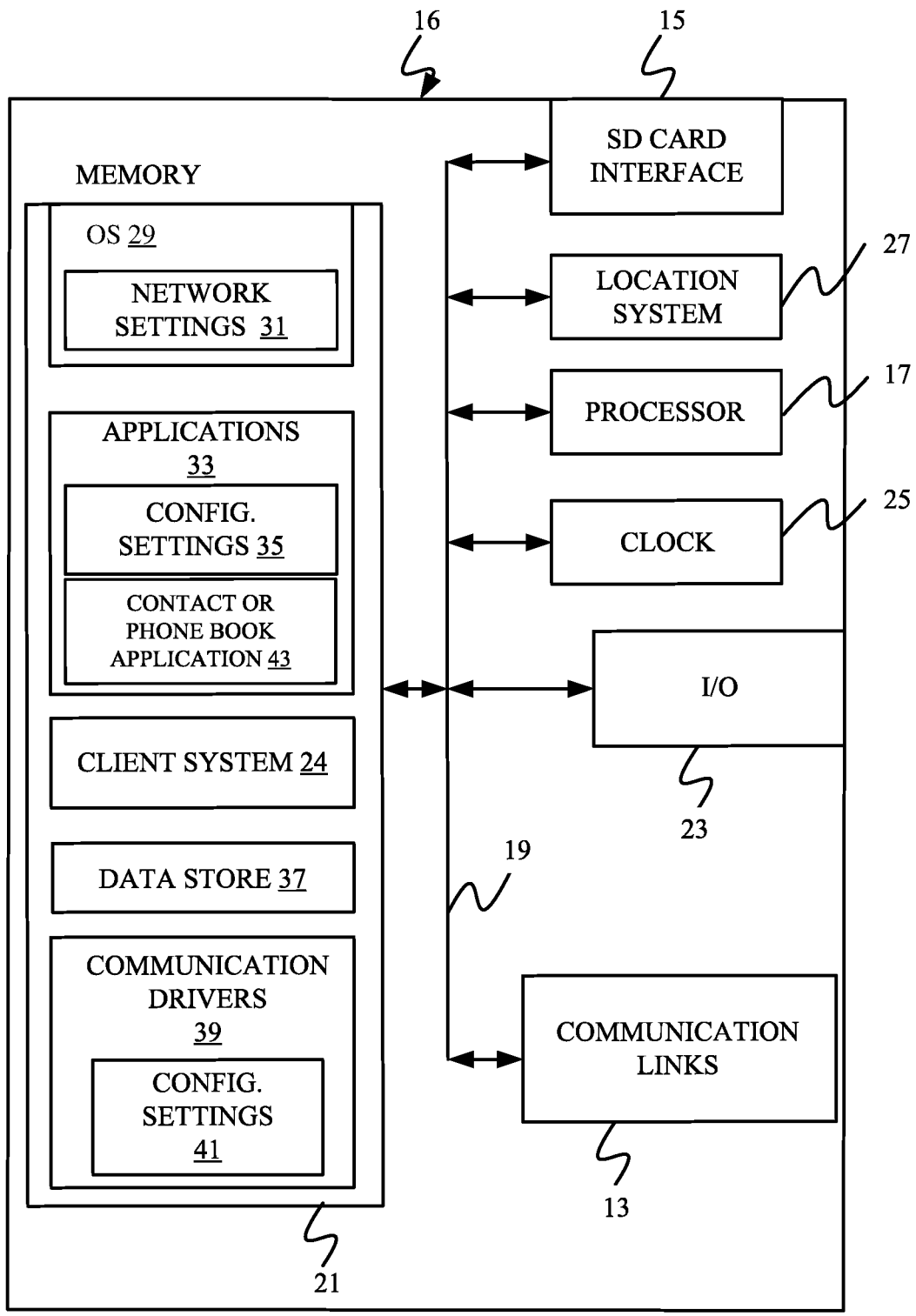
FIGS. 21, 22 and 23 show examples of mobile devices that can be used as operator interface mechanisms in the architectures shown in the previous Figures.
Figure 22:
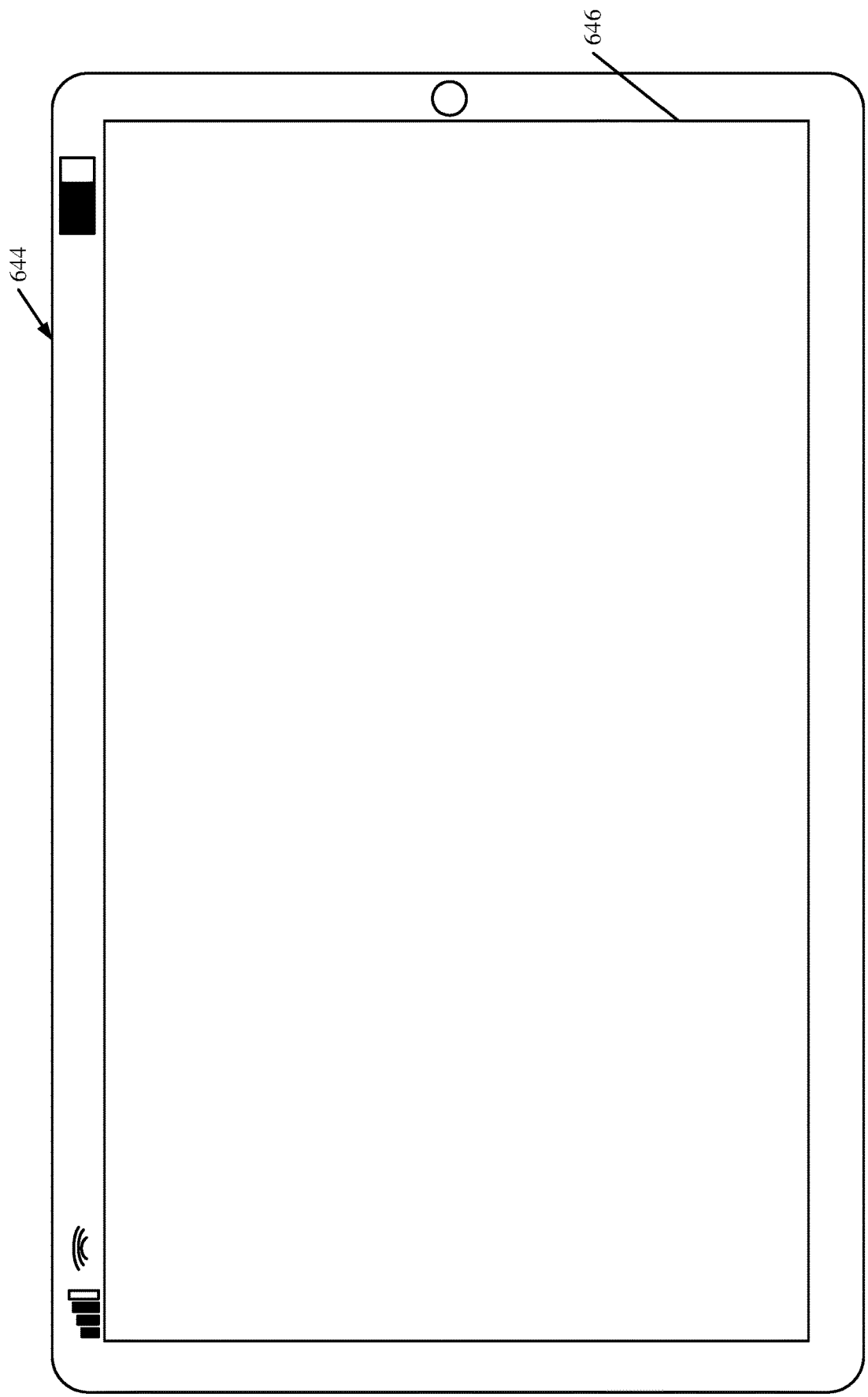
Figure 23:
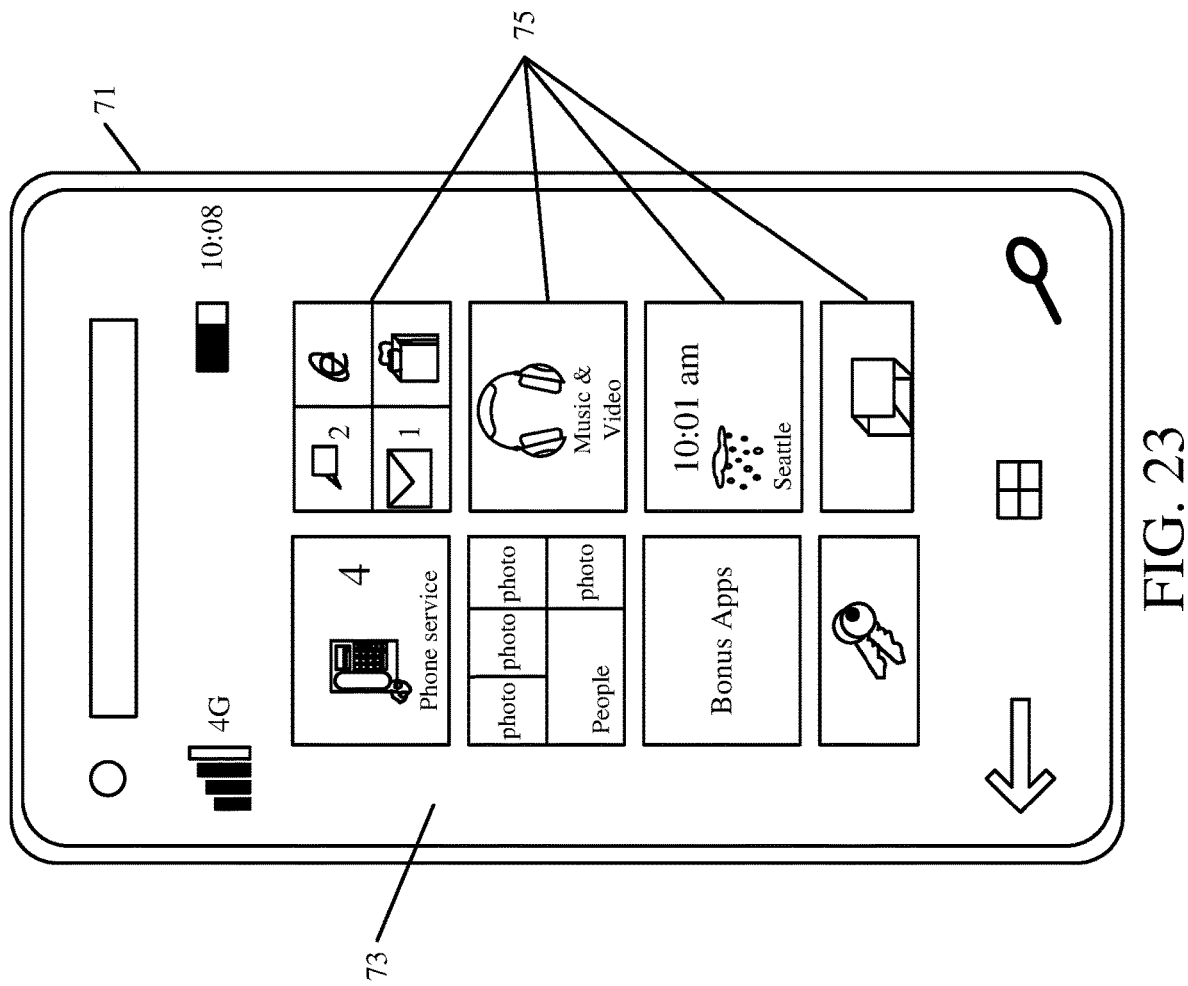

FIG. 21 is a simplified block diagram of one illustrative example of a handheld or mobile computing device that can be used as a user's or client's hand held device 16, in which the present system (or parts of it) can be deployed. For instance, a mobile device can be deployed in the operator compartment of towing vehicle 94 for use in generating, processing, or displaying the application data. FIGS. 22-23 are examples of handheld or mobile devices.

FIG. 21 provides a general block diagram of the components of a client device 16 that can run some components shown in FIGS. 1 and 12, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 22 shows one example in which device 16 (from FIG. 21) is a tablet computer 644. In FIG. 22, computer 644 is shown with user interface display screen 646. Screen 646 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 644 can also illustratively receive voice inputs as well.

FIG. 23 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 24:
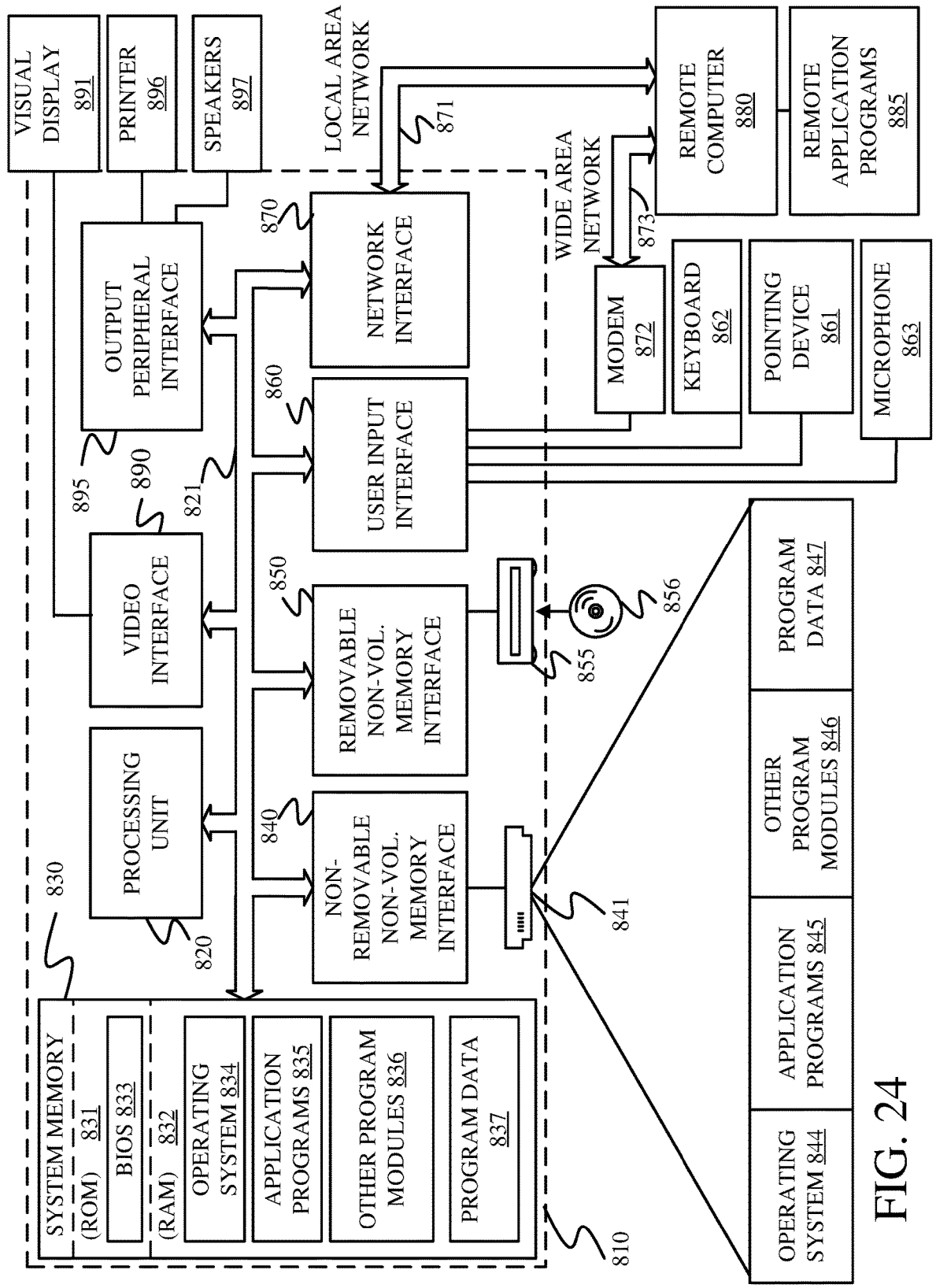
FIG. 24 is a block diagram showing one example of a computing environment that can be used in the architectures shown in the previous Figures.

FIG. 24 is one example of a computing environment in which elements of FIGS. 1 and 8, or parts of it, (for example) can be deployed. With reference to FIG. 24, an example system for implementing some embodiments includes a general-purpose computing device in the form of a computer 810. Components of computer 810 may include, but are not limited to, a processing unit 820 (which can comprise processors from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1 and 12 can be deployed in corresponding portions of FIG. 24.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 24 illustrates operating system 834, application programs 835, other program modules 836, and program data 837.

The computer 810 may also include other removable/non-removable volatile/nonvolatile computer storage media. By way of example only, FIG. 24 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 24, provide storage of computer readable instructions, data structures, program modules and other data for the computer 810. In FIG. 24, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 24 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a planting machine, comprising:
a furrow opener that opens a furrow as the planting machine moves across a field;
a seed delivery system that delivers seeds to seed positions in the furrow;
a material delivery system that is controlled to apply a material to the field;
an actuation identification system that generates an actuation timing indicator indicative of a timing for actuating the material delivery system to apply the material at material placement positions relative to the seed positions; and
a control signal generator that receives the actuation timing indicator and generates an actuation signal based on the actuation timing indicator to control the material delivery system to apply the material to the field.

Example 2 is the planting machine of any or all previous examples wherein the material delivery system comprises:
a motor that is actuated to drive an output element; and
a meter that is driven by the output element of the motor to apply an amount of material to the field.

Example 3 is the planting machine of any or all previous examples wherein the material delivery system comprises:

an application assembly having an inlet end that receives material, an outlet end and a conduit, disposed between the inlet end and the outlet end, through which the material passes to be applied to the field.

Example 4 is the planting machine of any or all previous examples wherein the meter is driven by the motor to introduce the amount of material into the inlet end of the application assembly for delivery to the field.

Example 5 is the planting machine of any or all previous examples wherein output element of the motor comprises an output shaft and wherein the meter comprises:

a flighted wheel, driven by the output shaft of the motor, that delivers a predefined amount of material into the inlet end of the application assembly, based on the actuation of the motor.

Example 6 is the planting machine of any or all previous examples wherein the material delivery system further comprises:

a material tank that holds the material and that has a material outlet defined therein, the meter being configured to move the amount of material to the material outlet, the inlet end of the application assembly receiving the amount of material from the material outlet of the material tank.

Example 7 is the planting machine of any or all previous examples wherein the actuation identification system comprises:

a frequency driven processing system configured to generate an a priori seed pattern indicative of a relative placement of seeds in the field, relative to a reference point.

Example 8 is the planting machine of any or all previous examples wherein the reference point comprises a position where the planting machine begins the planting operation, and wherein the frequency driven processing system comprises:

a planting operation start detector configured to detect when the planting machine begins the planting operation and to generate a planting operation start signal indicative of the reference point; and time to actuation calculator logic configured to generate the actuation timing indicator based on the a priori seed pattern and the planting operation start signal.

Example 9 is the planting machine of any or all previous examples and further comprising:

an actual seed pattern detection system configured to detect an actual seed pattern;

a pattern correction value identifier configured to identify a pattern correction value based on the a priori seed pattern and the actual seed pattern; and seed pattern correction logic configured to apply the pattern correction value to the a priori seed pattern to generate a corrected seed pattern.

Example 10 is the planting machine of any or all previous examples and further comprising a seed sensor configured to detect a seed and generate a seed sensor signal indicative of the detected seed, and wherein the actuation identification system comprises:

an event driven processing system configured to generate the actuation timing indicator based on the seed sensor signal.

Example 11 is the planting machine of any or all previous examples wherein the seed sensor is located at a seed sensor location on the planting machine and wherein the event driven processing system comprises:

a time stamp generator configured to generate a time stamp corresponding to the seed sensor signal indicating a detected seed; and a system delay generator that generates a seed travel time delay value indicative of a time delay between the time stamp and a time when the detected seed will be in a final seed position.

Example 12 is the planting machine of any or all previous examples wherein the event driven processing system is configured to generate the actuation timing indicator based on a position of the material delivery system on the planting machine and based on the seed travel time delay value, and wherein the event driven processing system comprises:

a time offset generator configured to generate a time offset value indicative of a time delay between generating the actuation signal and a time when the material is applied to the field based on a responsiveness of the material delivery system.

Example 13 is the planting machine of any or all previous examples and further comprising:

a seed firmer, wherein the seed sensor is mounted to the seed firmer.

Example 14 is the planting machine of any or all previous examples wherein the outlet end of the application assembly is located on the seed firmer.

Example 15 is the planting machine of any or all previous examples wherein the outlet end of the application assembly is located on the seed delivery system Example 16 is the planting machine of any or all previous examples wherein the seed sensor is configured to sense the seed in the furrow.

Example 17 is a method of controlling a planting machine, comprising:

opening a furrow as the planting machine moves across a field;

delivering seeds to seed positions in the furrow;

generating an actuation timing indicator indicative of a timing for actuating a material delivery system to apply material at material placement positions relative to the seed positions; and generating a material delivery system control signal based on the actuation timing indicator to control the material delivery system to apply the material to the field.

Example 18 is the method of any or all previous examples wherein generating an actuation timing indicator comprises:

generating an a priori seed pattern indicative of a relative placement of seeds in the field, relative to a reference point;

detecting when the planting machine begins the planting operation;

generating a planting operation start signal identifying a position where the planting machine begins the planting operation and being indicative of the reference point; and generating the actuation timing indicator based on the a priori seed pattern and the planting operation start signal.

Example 19 is the method of any or all previous examples wherein generating the actuation timing indicator comprises:

detecting a seed with a seed sensor at a seed sensor location on the planting machine;

generating a seed sensor signal indicative of the detected seed; and generating a time stamp corresponding to the seed sensor signal indicating a detected seed;

generating a seed travel time delay value indicative of a time delay between the time stamp and a time when the detected seed will be in a final seed position;

generating a time offset value indicative of a time delay between generating the actuation signal and a time when the material is applied to the field, based on a responsiveness of the material delivery system;

generating the actuation timing indicator based on a position of the material delivery system on the planting machine and based on the seed travel time delay value and the time offset value.

Example 20 is a planting machine, comprising:

a furrow opener that opens a furrow as the planting machine moves across a field;

a seed delivery system that delivers seeds to seed positions in the furrow;

a motor that is actuated to drive an output element;

an application assembly having an inlet end that receives material, an outlet end, and a conduit, disposed between the inlet end and the outlet end, through which the material passes to be applied to the field;

a meter that is driven by the output element of the motor to apply an amount of material to the inlet end of the application assembly;

an actuation identification system that generates an actuation timing indicator indicative of a timing for actuating the motor to apply the material at material placement positions relative to the seed positions; and a control signal generator that receives the actuation timing indicator and generates an actuation signal based on the actuation timing indicator to control the motor to drive the meter to apply the material to the field.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A planting machine comprising:
a furrow opener configured to open a furrow as the planting machine moves across a field;
a seed delivery system configured to deliver seeds to seed positions in the furrow;
a granular material delivery system controllable to discontinuously apply a granular material, different than the seeds, to the field, the granular material delivery system comprising an inlet end configured to receive the granular material, an outlet end coupled to the seed delivery system, and a conduit disposed between the inlet end and the outlet end;
an actuation identification system configured to generate an actuation timing indicator indicative of a timing for actuating the material delivery system to apply the granular material at material placement positions relative to the seed positions;
a control signal generator configured to receive the actuation timing indicator and to generate an actuation signal based on the actuation timing indicator to control the material delivery system to apply the granular material to the field.

2. The planting machine of claim 1, wherein the granular material delivery system comprises:
a motor configured to drive an output element; and
a meter configured to be driven by the output element of the motor to apply an amount of granular material to the field.

3. The planting machine of claim 2 wherein the meter is configured to be driven by the motor to introduce the amount of granular material into the inlet end of the conduit for delivery to the field.

4. The planting machine of claim 3, wherein the granular material delivery system further comprises:

a material tank configured to hold the granular material and that has a material outlet defined therein, the meter being configured to move the amount of material to the material outlet, the inlet end of the conduit configured to receive the amount of material from the material outlet of the material tank.

5. The planting machine of claim 2, wherein the conduit comprises a continuous conduit extending between the inlet end and the outlet end through which the granular material passes to exit the planting machine and be applied to the field;
wherein the output element of the motor comprises an output shaft; and
wherein the meter comprises a flighted wheel configured to be driven by the output shaft of the motor and to deliver a predefined amount of granular material into the inlet end of the continuous conduit, based on the actuation of the motor.

6. The planting machine of claim 2, wherein the timing actuation indicator comprises a duration indicator indicative of how much the meter should rotate and a time indicator indicative of when the meter should begin rotating and wherein the actuation indication system is configured to:
identify a longitudinal distance between the material delivery system and the seed delivery system;
generate the time indicator based on the identified longitudinal distance;
identify a distance on either side of a seed location along which the granular material is to be applied; and
generate the duration indicator based on the identified distance on either side of the seed location along which the granular material is to be applied.

7. The planting machine of claim 6, wherein the control signal generator is configured to generate the actuation signal to initiate rotation of the meter based on the time indicator and to continue rotation of the meter based on the duration indicator.

8. The planting machine of claim 1, wherein the actuation identification system comprises:
a frequency driven processing system configured to generate an a priori seed pattern indicative of a relative placement of seeds in the field, relative to a reference point.

9. The planting machine of claim 8, wherein the reference point comprises a position where the planting machine begins the planting operation, and wherein the frequency driven processing system comprises:
a planting operation start detector configured to detect when the planting machine begins the planting operation and to generate a planting operation start signal indicative of the reference point; and
time to actuation calculator logic configured to generate the actuation timing indicator based on the a priori seed pattern and the planting operation start signal.

10. The planting machine of claim 9 and further comprising:
an actual seed pattern detection system configured to detect an actual seed pattern;
a pattern correction value identifier configured to identify a pattern correction value based on the a priori seed pattern and the actual seed pattern; and
seed pattern correction logic configured to apply the pattern correction value to the a priori seed pattern to generate a corrected seed pattern.

11. The planting machine of claim 1 and further comprising a seed sensor configured to detect a seed and generate a seed sensor signal indicative of the detected seed, and wherein the actuation identification system comprises:
an event driven processing system configured to generate the actuation timing indicator based on the seed sensor signal.

12. The planting machine of claim 11, wherein the seed sensor is located at a seed sensor location on the planting machine and wherein the event driven processing system comprises:
a time stamp generator configured to generate a time stamp corresponding to the seed sensor signal indicating a detected seed; and
a system delay generator configured to generate a seed travel time delay value indicative of a time delay between the time stamp and a time when the detected seed will be in a final seed position.

13. The planting machine of claim 12, wherein the event driven processing system is configured to generate the actuation timing indicator based on a position of the material delivery system on the planting machine and based on the seed travel time delay value, and wherein the event driven processing system comprises;
a time offset generator configured to generate a time offset value indicative of a time delay between generating the actuation signal and a time when the granular material is applied to the field based on a responsiveness of the material delivery system.

14. The planting machine of claim 12 and further comprising;
a seed firmer, wherein the seed sensor is mounted to the seed firmer.

15. The planting machine of claim 12, wherein the seed sensor is configured to sense the seed in the furrow.

16. A method of controlling a planting machine, the method comprising:
opening a furrow as the planting machine moves across a field;
delivering, with a seed delivery system, seeds to seed positions in the furrow;
generating an actuation timing indicator indicative of a timing for actuating a granular material delivery system to apply granular material, though a granular material delivery system outlet coupled to the seed delivery system and at material placement positions relative to the seed positions; and
generating a material delivery system control signal based on the actuation timing indicator to control the material delivery system to apply the granular material to the field.

17. The method of claim 16, wherein generating an actuation timing indicator comprises:
generating an a priori seed pattern indicative of a relative placement of seeds in the field, relative to a reference point;
detecting when the planting machine begins the planting operation;
generating a planting operation start signal identifying a position where the planting machine begins the planting operation and being indicative of the reference point; and
generating the actuation timing indicator based on the a priori seed pattern and the planting operation start signal.

18. The method of claim 16, wherein generating the actuation timing indicator comprises:
detecting a seed with a seed sensor at a seed sensor location on the planting machine;
generating a seed sensor signal indicative of the detected seed; and
generating a time stamp corresponding to the seed sensor signal indicating a detected seed;
generating a seed travel time delay value indicative of a time delay between the time stamp and a time when the detected seed will be in a final seed position;
generating a time offset value indicative of a time delay between generating the actuation signal and a time when the granular material is applied to the field, based on a responsiveness of the granular material delivery system;
generating the actuation timing indicator based on a position of the granular material delivery system on the planting machine and based on the seed travel time delay value and the time offset value.

19. A planting machine comprising:
a furrow opener configured to open a furrow as the planting machine moves across a field;
a seed delivery system configured to deliver seeds to seed positions in the furrow;
a motor that is actuated to drive an output element;
a granular application assembly having an inlet end that receives granular material, an outlet end coupled to the seed delivery system, and a conduit, disposed between the inlet end and the outlet end, through which the granular material passes to be applied to the field;
a meter configured to be driven by the output element of the motor to apply an amount of granular material to the inlet end of the application assembly;
an actuation identification system that generates an actuation timing indicator indicative of a timing for actuating the motor to apply the granular material at material placement positions relative to the seed positions; and
a control signal generator that receives the actuation timing indicator and generates an actuation signal based on the actuation timing indicator to control the motor to drive the meter to apply the granular material to the field.

* * * * *